United States Patent
Shishido et al.

(10) Patent No.: US 8,928,814 B2
(45) Date of Patent: Jan. 6, 2015

(54) METHOD AND APPARATUS FOR DETECTING MOTION VECTOR

(75) Inventors: Tomoyuki Shishido, Kawasaki (JP); Hideki Aiba, Moriya (JP)

(73) Assignee: JVC Kenwood Corporation (JP)

(*) Notice: Subject to any disclaimer, the term of this patent is extended or adjusted under 35 U.S.C. 154(b) by 329 days.

(21) Appl. No.: 13/615,800

(22) Filed: Sep. 14, 2012

(65) Prior Publication Data

US 2013/0076985 A1    Mar. 28, 2013

(30) Foreign Application Priority Data

Sep. 27, 2011  (JP) .................................. 2011-210985

(51) Int. Cl.
*H04N 5/14* (2006.01)

(52) U.S. Cl.
CPC .............. *H04N 19/533* (2014.11); *H04N 19/43* (2014.11)
USPC ..................... 348/700; 375/240.16

(58) Field of Classification Search
CPC ................................ H04N 7/50; H04N 5/147
USPC ...................... 348/700; 375/240.16
See application file for complete search history.

(56) References Cited

U.S. PATENT DOCUMENTS

| | | | | |
|---|---|---|---|---|
| 5,621,481 A | * | 4/1997 | Yasuda et al. | 348/699 |
| 5,982,910 A | * | 11/1999 | Drexler et al. | 382/107 |
| 6,269,174 B1 | * | 7/2001 | Koba et al. | 382/107 |
| 6,307,973 B2 | * | 10/2001 | Nishikawa et al. | 382/238 |
| 7,453,941 B1 | * | 11/2008 | Yamori et al. | 375/240.15 |
| 7,590,179 B2 | * | 9/2009 | Mukerjee | 375/240.15 |
| 2005/0141615 A1 | * | 6/2005 | Kim | 375/240.16 |

FOREIGN PATENT DOCUMENTS

| | | |
|---|---|---|
| JP | 2001082846 | 3/2001 |
| JP | 2011082846 | 4/2011 |

* cited by examiner

*Primary Examiner* — Dave Czekaj
*Assistant Examiner* — James Pontius
(74) *Attorney, Agent, or Firm* — Cantor Colburn LLP

(57) ABSTRACT

Provided is a motion vector detecting apparatus capable of detecting a motion vector based on each of front and rear frames as a starting point while restraining an increase of a circuit scale. A starting pixel generation unit generates starting pixel data based on pixel data in a frame f0 or a frame f1. A search range pixel generation unit generates search range pixel data based on pixel data in the frame f1 or the frame f0. Switches alternately switch the frames f0 and f1 at every line. A motion vector selection unit generates alternately a motion vector based on the frame f0 as a starting point and a motion vector based on the frame f1 as a starting point. A correlation comparing unit selects one motion vector having higher correlation between the motion vectors.

6 Claims, 26 Drawing Sheets

| f1-1-1 | f1-1-2 | f1-1-3 | f1-1-4 | f1-1-5 |
|--------|--------|--------|--------|--------|
| —      | —      | —      | —      | —      |
| f1-3-1 | f1-3-2 | f1-3-3 | f1-3-4 | f1-3-5 |
| —      | —      | —      | —      | —      |
| f1-5-1 | f1-5-2 | f1-5-3 | f1-5-4 | f1-5-5 |

FIG. 6B

| — | — | — | — | — |
|---|---|---|---|---|
| f0-2-1 | f0-2-2 | f0-2-3 | f0-2-4 | f0-2-5 |
| — | — | — | — | — |
| f0-4-1 | f0-4-2 | f0-4-3 | f0-4-4 | f0-4-5 |
| — | — | — | — | — |
| f0-6-1 | f0-6-2 | f0-6-3 | f0-6-4 | f0-6-5 |

| f0-1-1 | f0-1-2 | f0-1-3 | f0-1-4 | f0-1-5 |
|--------|--------|--------|--------|--------|
| —      | —      | —      | —      | —      |
| f0-3-1 | f0-3-2 | f0-3-3 | f0-3-4 | f0-3-5 |
| —      | —      | —      | —      | —      |
| f0-5-1 | f0-5-2 | f0-5-3 | f0-5-4 | f0-5-5 |

| | | | | | | |
|---|---|---|---|---|---|---|
| (A) | fA | f0-1 | f0-2 | f0-3 | f0-4 | f0-5 | f0-6 | f0-7 | f0-8 | f0-9 | ... |
| (B) | fA' | f0-1 | f0-2 | f0-3 | f0-4 | f0-5 | f0-6 | f0-7 | f0-8 | f0-9 | ... |
| (C) | fB | f1-1 | f1-2 | f1-3 | f1-4 | f1-5 | f1-6 | f1-7 | f1-8 | f1-9 | ... |
| (D) | fB' | | f1-1 | f1-2 | f1-3 | f1-4 | f1-5 | f1-6 | f1-7 | f1-8 | ... |
| (E) | f01 | f0-1 | f0-2 | f0-3 | f0-4 | f0-5 | f1-5 | f1-6 | f1-7 | f0-9 | ... |
| (F) | f10 | f1-1 | f1-1 | f1-3 | f0-4 | f0-5 | f0-6 | f0-7 | f0-8 | f1-9 | ... |

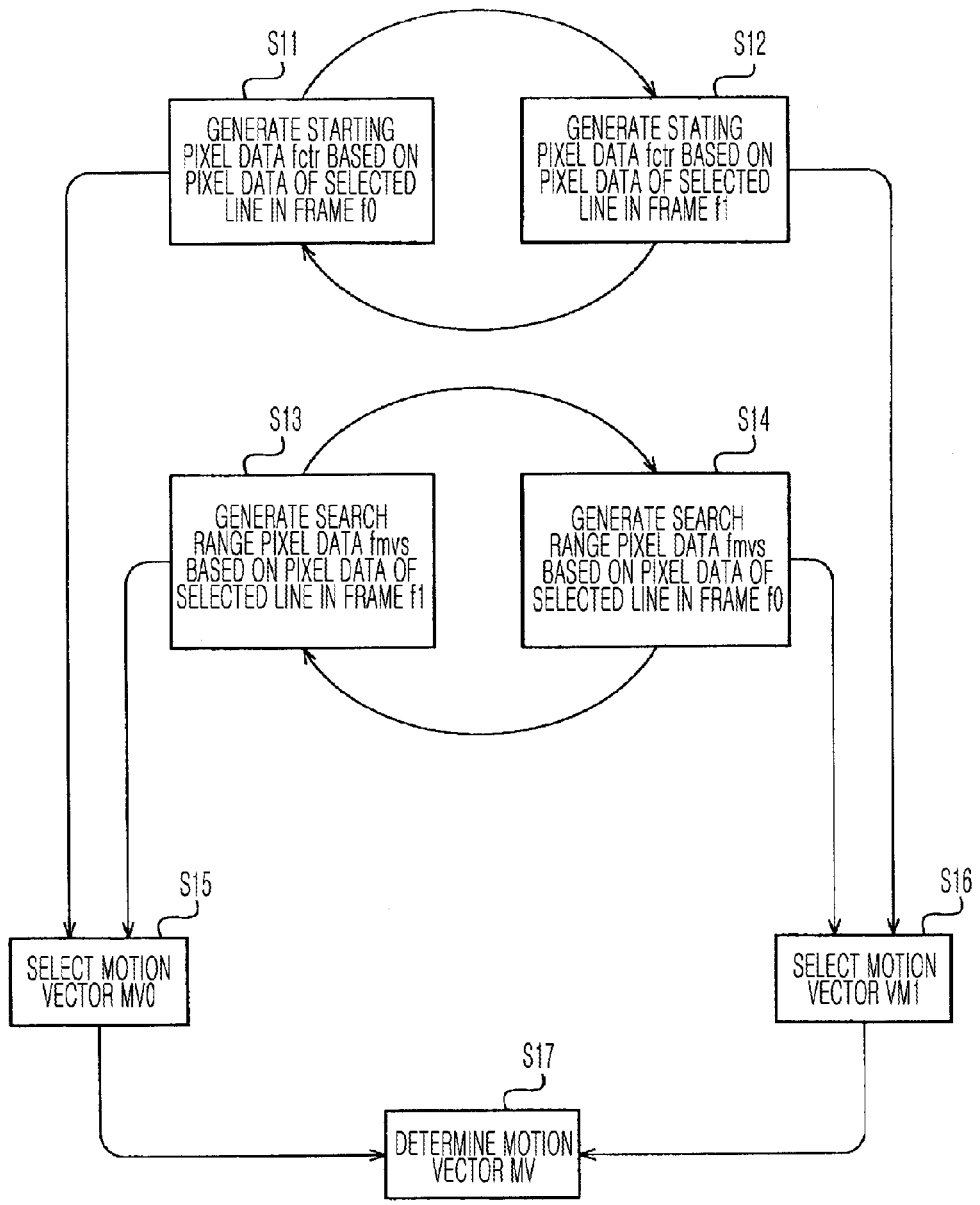

METHOD AND APPARATUS FOR DETECTING MOTION VECTOR

CROSS-REFERENCE TO RELATED PATENT APPLICATIONS

This application claims the benefit of Japanese Patent Application No. 2011-210985, filed on Sep. 27, 2011, in the Japan Patent Office, the disclosure of which is incorporated herein in its entirety by reference.

BACKGROUND OF THE INVENTION

1. Field of the Invention

The present invention relates to a method and apparatus for detecting motion vectors of an image.

2. Description of the Related Art

If a video is displayed on an image display device using a liquid crystal panel, a motion blur is likely to be generated. Thus, in order to improve a video characteristic by reducing a motion blur, the number of frames is increased by interpolating compensated frames between real frames of an image signal, for example, an image is displayed by converting a frame rate (frame frequency) having a vertical frequency of 60 Hz to double, i.e., 120 Hz, or more. An image display device displaying images by converting a frame rate of a signal detects a motion vector of an image, generates each interpolation pixel by using the motion vector, and then, generates an interpolation frame that is interpolated between actual frames.

The motion vector is detected by estimation based on pixels within a defined number of frames among successive frames, and it is difficult to detect the motion vector without a false detection. For example, when a front view image on a front portion spatially and a background view image on a rear portion spatially move different from each other, a false detection of the motion vector is likely to occur. A method of improving an accuracy of detecting motion vectors in the above case is disclosed in Patent Document 1. A motion vector detecting apparatus disclosed in the Patent Document 1 detects motion vectors based on each of front and rear frames, and designates a motion vector having higher correlation as a final motion vector. Accordingly, a false detection of a motion vector may be reduced.

In a configuration of detecting the motion vectors based on each of front and rear frames disclosed in the Patent Document 1, two circuits for detecting the motion vectors are necessary, and thus, a circuit scale increases to thus increase costs. Thus, it is necessary to restrain an increase of the circuit scale.

(Patent Reference 1) Japanese Laid-open Patent Publication No. 2011-82846

SUMMARY OF THE INVENTION

The present invention provides a method and apparatus for detecting motion vectors based on each of front and rear frames while restraining an increase of a circuit scale.

According to an aspect of the present invention, there is provided a motion vector detecting apparatus including: a starting pixel generation unit which generates a starting pixel data when detecting a motion vector based on pixel data in a first frame or a second frame that is front or rear frame in timing order; a search range pixel generation unit which generates a plurality of pieces of search range pixel data included in predetermined search ranges in a horizontal direction and a vertical direction for detecting the motion vector based on the pixel data in the second frame when the starting pixel generation unit generates the starting pixel data based on the pixel data in the first frame, and generates the search range pixel data based on the pixel data in the first frame when the starting pixel generation unit generates the starting pixel data based on the pixel data in the second frame; a first switching unit which switches alternately and repeatedly between a state where the starting pixel generation unit generates the pixel data of one line selected from an odd-numbered line and an even-numbered line in the first frame as the starting pixel data and a state where the starting pixel generation unit generates the pixel data of the selected line in the second frame as the starting pixel data, at every line in the first and second frames; a second switching unit which switches alternately and repeatedly between a state where the search range pixel generation unit generates the search range pixel data based on the pixel data of one line of the odd-numbered line and the even-numbered line in the first frame, and a state where the search range pixel generation unit generates the search range pixel data based on the pixel data of the other line between the odd-numbered line and the even-numbered line in the second frame, at every line in the first and second frames; a motion vector candidate selection unit which selects a motion vector candidate having highest correlation among a plurality of motion vector candidates connecting a pixel of the starting pixel data and each of pixels of the search range pixel data to each other as a first motion vector when the starting pixel generation unit generates the starting pixel data based on the pixel data in the first frame by the switching of the first switching unit and the search range pixel generation unit generates the search range pixel data based on the pixel data in the second frame by the switching of the second switching unit, and selects a motion vector candidate having highest correlation among a plurality of motion vector candidates connecting a pixel of the starting pixel data and each of pixels of the search range pixel data to each other as a second motion vector when the starting pixel generation unit generates the starting pixel data based on the pixel data in the second frame by the switching of the first switching unit and when the search range pixel generation unit generates the search range pixel data based on the pixel data in the first frame by the switching of the second switching unit; and a correlation comparing unit which compares the first and second motion vectors with each other, and selects and outputs the motion vector having higher correlation.

According to another aspect of the present invention, there is provided a motion vector detecting apparatus including: a starting pixel generation unit which generates a starting pixel data when detecting a motion vector, based on pixel data in a first frame or a second frame that is front or rear frame in timing order; a search range pixel generation unit which generates a plurality of pieces of search range pixel data included in predetermined search ranges in a horizontal direction and a vertical direction for detecting the motion vector based on the pixel data in the second frame when the starting pixel generation unit generates the starting pixel data based on the pixel data in the first frame, and generates the search range pixel data based on the pixel data in the first frame when the starting pixel generation unit generates the starting pixel data based on the pixel data in the second frame; a first switching unit which switches alternately and repeatedly between a state where the starting pixel generation unit generates the pixel data of one line selected from an odd-numbered line and an even-numbered line in the first frame as the starting pixel data and a state where the starting pixel generation unit generates the pixel data of the selected line in the second frame as the starting pixel data, at every line in the first and second frames; a second switching unit which switches alternately and repeatedly between a state where the search range pixel generation unit generates the search range pixel data based on the pixel data of the selected line in the first frame, and a state where the search range pixel generation unit generates the search range pixel data based on the pixel data of the selected line in the second frame, at every line in the first and second frames; a motion vector candidate selection unit which selects a motion vector candidate having highest correlation among a plurality of motion vector candidates connecting a pixel of the starting pixel data and each of pixels of the search range pixel data to each other as a first motion vector when the starting pixel generation unit generates the starting pixel data based on the pixel data in the first frame by the switching of the first switching unit and the search range pixel generation unit generates the search range pixel data based on the pixel data in the second frame by the switching of the second switching unit, and selects a motion vector candidate having highest correlation among a plurality of motion vector candidates connecting a pixel of the starting pixel data and each of pixels of the search range pixel data to each other as a second motion vector when the starting pixel generation unit generates the starting pixel data based on the pixel data in the second frame by the switching of the first switching unit and when the search range pixel generation unit generates the search range pixel data based on the pixel data in the first frame by the switching of the second switching unit; and a correlation comparing unit which compares the first and second motion vectors with each other, and selects and outputs the motion vector having higher correlation.

According to another aspect of the present invention, there is provided a motion vector detecting method including: repeating alternately a state where pixel data of one line selected between an odd-numbered line and an even-numbered line in a first frame is generated as starting pixel data when detecting a motion vector, and a state where pixel data of the selected line in a second frame is generated as starting pixel data at every line in the first and second frames, wherein the first and second frames are front and rear frames in timing order; repeating alternately a state where a plurality of pieces of search range pixel data included in predetermined search ranges in a horizontal direction and a vertical direction for detecting the motion vector is generated based on the pixel data of one line of the odd-numbered line and the even-numbered line in the first frame and a state where the search range pixel data is generated based on the pixel data of the other line of the odd-numbered line and the even-numbered line in the second frame, at every line in the first and second frames, wherein the search range pixel data is generated based on the pixel data of the second frame when the starting pixel data is generated based on the pixel data of the first frame and the search range pixel data is generated based on the pixel data of the first frame when the starting pixel data is generated based on the pixel data in the second frame; selecting a motion vector candidate having highest correlation among a plurality of motion vector candidates connecting a pixel of the starting pixel data and each of pixels of the search range pixel data to each other as a first motion vector, when the starting pixel data is generated based on the pixel data of the first frame and when the search range pixel data is generated based on the pixel data in the second frame; selecting a motion vector candidate having highest correlation among a plurality of motion vector candidates connecting a pixel of the starting pixel data and each of pixels of the search range pixel data to each other as a second motion vector, when the starting pixel data is generated based on the pixel data of the second frame and when the search range pixel data is generated based on the pixel data in the first frame; and selecting and outputting one of the first and second motion vectors having higher correlation by comparing the first and second motion vectors with each other.

According to another aspect of the present invention, there is provided a motion vector detecting method including: repeating alternately a state where pixel data of one selected between an odd-numbered line and an even-numbered line in a first frame is generated as starting pixel data when detecting a motion vector, and a state where pixel data of the selected line in a second frame as starting pixel data at every line in the first and second frames, wherein the first and second frames are front and rear frames in timing order; repeating alternately a state where a plurality of pieces of search range pixel data is generated based on the pixel data of the selected line in the first frame and a state where the search range pixel data is generated based on the pixel data of the selected line in the second frame, wherein the search range pixel data is generated based on the pixel data of the second frame when the starting pixel data is generated based on the pixel data of the first frame and the search range pixel data is generated based on the pixel data of the first frame when the starting pixel data is generated based on the pixel data in the second frame; selecting a motion vector candidate having highest correlation among a plurality of motion vector candidates connecting a pixel of the starting pixel data and each of pixels of the search range pixel data to each other as a first motion vector, when the starting pixel data is generated based on the pixel data of the first frame and when the search range pixel data is generated based on the pixel data in the second frame; selecting a motion vector candidate having highest correlation among a plurality of motion vector candidates connecting a pixel of the starting pixel data and each of pixels of the search range pixel data to each other as a second motion vector, when the starting pixel data is generated based on the pixel data of the second frame and when the search range pixel data is generated based on the pixel data in the first frame; and selecting and outputting one of the first and second motion vectors having higher correlation by comparing the first and second motion vectors with each other.

BRIEF DESCRIPTION OF THE DRAWINGS

The above and other features and advantages of the present invention will become more apparent by describing in detail exemplary embodiments thereof with reference to the attached drawings in which:

FIG. 2 is a view for showing pixel data in each of the components shown in FIG. 1 by a line unit;

FIGS. 5A and 5B are views showing a planar positional relation between pixel data in a case where starting pixel data is generated based on pixel data in a frame f0 shown in FIG. 1 and search range pixel data is generated based on pixel data in a frame f1;

FIGS. 6A and 6B are views showing a planar positional relation between pixel data in a case where starting pixel data is generated based on pixel data in a frame f1 shown in FIG. 1 and search range pixel data is generated based on pixel data in a frame f0;

FIG. 11 is a view for showing pixel data in each of the components shown in FIG. 10 by a line unit;

FIGS. 12A and 12B are views showing a planar positional relation between pixel data in a case where starting pixel data is generated based on pixel data in a frame f1 shown in FIG. 10 and search range pixel data is generated based on pixel data in a frame f0;

FIG. 16 is a view for showing pixel data in each of the components shown in FIG. 14 by a line unit when a frame f0 is an even-numbered frame according to the third embodiment of the present invention;

FIG. 17 is a view for showing pixel data in each of the components shown in FIG. 14 by a line unit when a frame f0 is an odd-numbered frame according to the third embodiment of the present invention;

FIG. 18 is a view for showing pixel data in each of the components shown in FIG. 14 by a line unit when a frame f0 is an even-numbered frame according to the fourth embodiment of the present invention;

FIG. 19 is a view for showing pixel data in each of the components shown in FIG. 14 by a line unit when a frame f0 is an odd-numbered frame according to the fourth embodiment of the present invention;

FIG. 21 is a conceptual view for describing a method of detecting a motion vector, according to a second embodiment and a fourth embodiment of the present invention.

DETAILED DESCRIPTION OF THE INVENTION

Figure 1:
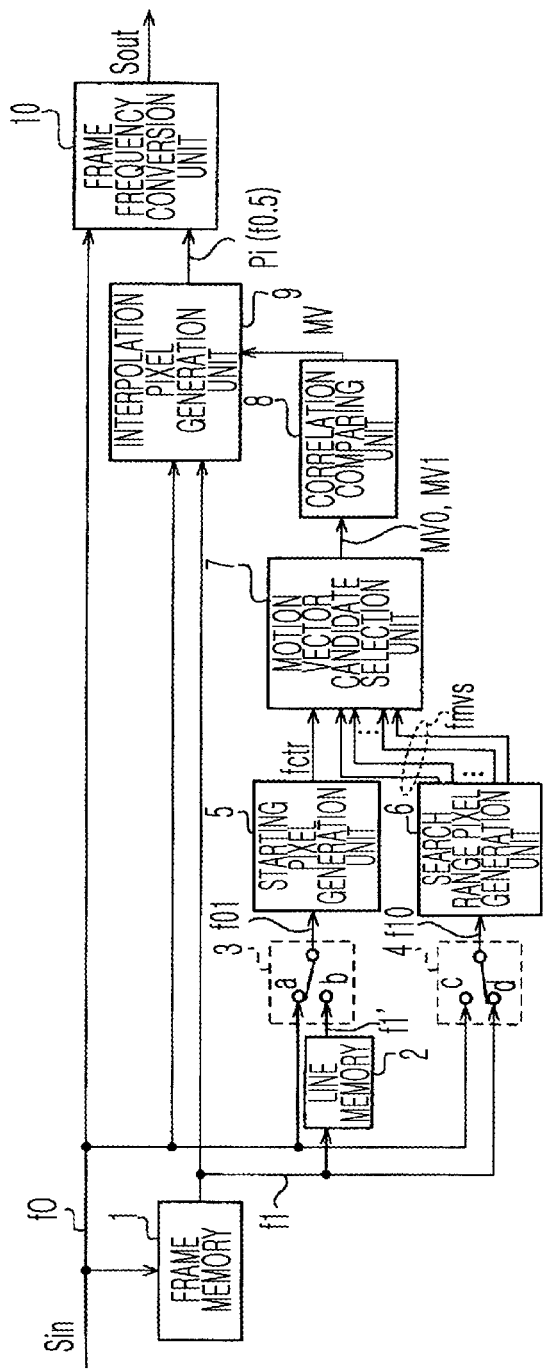
FIG. 1 is a block diagram of a motion vector detecting apparatus according to a first embodiment of the present invention.
Figure 10:
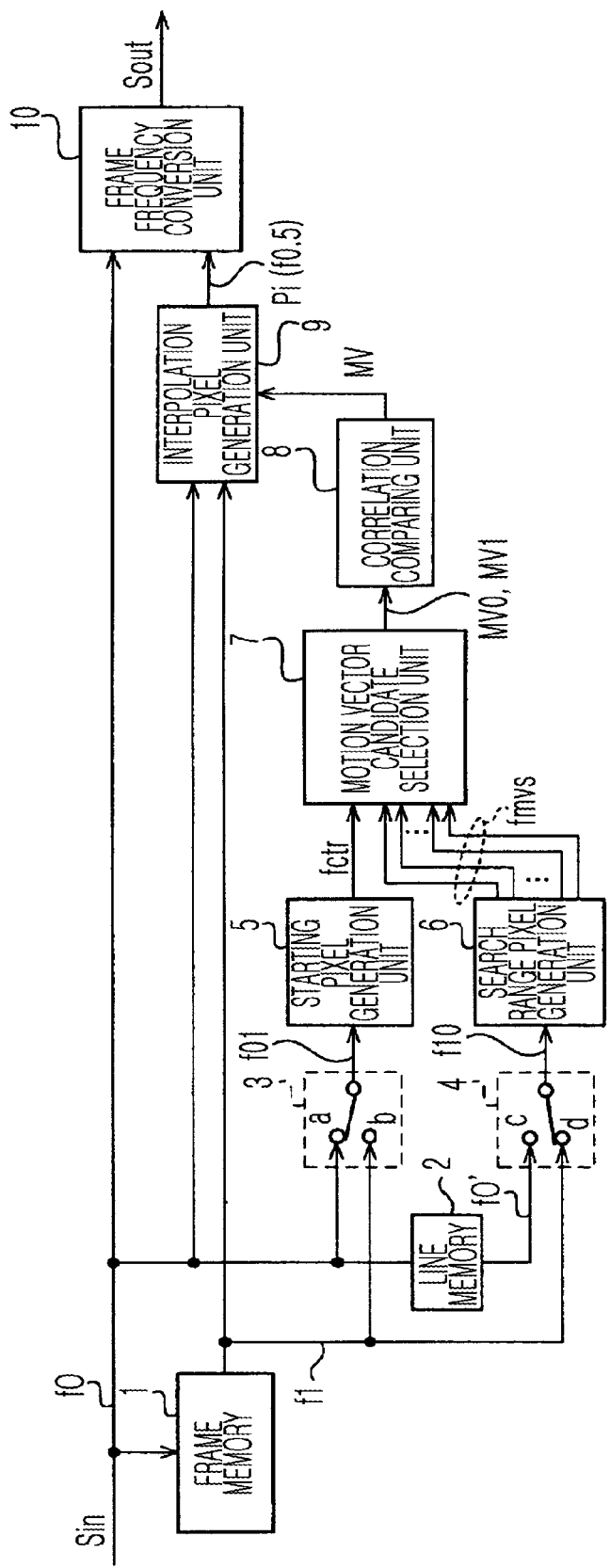
FIG. 10 is a block diagram of a motion vector detecting apparatus according to a second embodiment of the present invention.

Hereinafter, a method and apparatus for detecting a motion vector, according to embodiments of the present invention, will be described with reference to accompanying drawings. FIGS. 1 and 10 show a frame rate converting apparatus including a motion vector detecting apparatus as an example.

First Embodiment

Referring to FIG. 1, each piece of pixel data of an input image signal Sin is sequentially input to a frame memory 1, switches 3 and 4, an interpolation pixel generation unit 9, and a frame frequency conversion unit 10. The frame memory 1 outputs the input pixel data after delaying the input pixel data for one frame period. A current frame of the image signal Sin is referred to as a frame f0, and a frame that is one frame prior to the current frame, which is output from the frame memory 1, is referred to as a frame f1. Pixel data of the frame f1 output from the frame memory 1 is sequentially input to a line memory 2, the switch 4, and the interpolation pixel generation unit 9.

The line memory 2 delays pixel data in each of the lines of the input frame f1 for one line period, and outputs the delayed pixel data as a frame f1'. The frame f1' is delayed from the frame f1 for one line period.

The pixel data of the frame f0 is input to a terminal a of the switch 3, and the pixel data of the frame f1' output from the line memory 2 is input to a terminal b of the switch 3. The pixel data of the frame f0 is input to a terminal c of the switch 4, and the pixel data of the frame f1 is input to a terminal d of the switch 4.

The switch 3 switches between the terminals a and b at every line and outputs pixel data f01. The switch 4 switches between the terminals c and d at every line and outputs pixel data f10. As shown in FIG. 1, when the switch 3 is connected to the terminal a that selects and outputs the pixel data of the frame f0, the switch 4 is connected to the terminal d that selects and outputs the pixel data of the frame f1. When the switch 3 is connected to the terminal b that selects and outputs the pixel data of frame f1', the switch 4 is connected to the terminal c that selects and outputs the pixel data of the frame f0.

Figure 2:
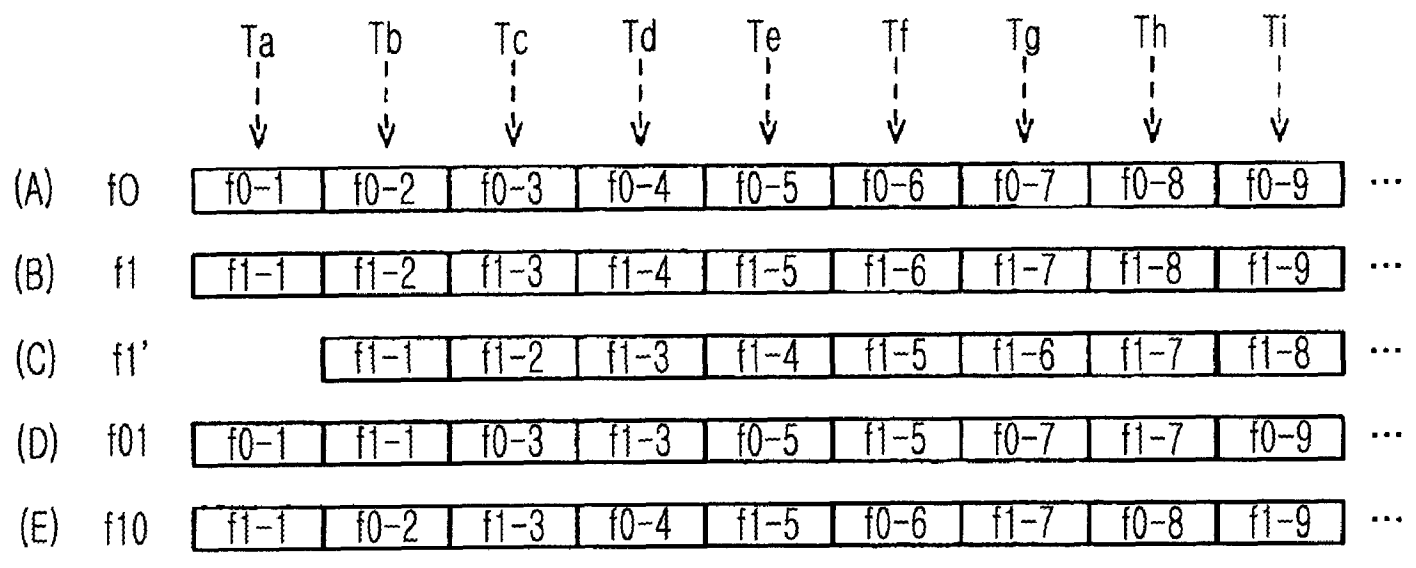

The pixel data f01 and f10 output from the switches 3 and 4 are described with reference to FIG. 2. In FIG. 2, Ta, Tb, Tc, . . . denote timings of each of the lines. In FIG. 2(A), f0-1, f0-2, f0-3, . . . denote the pixel data of the frame f0 in a line unit. In FIG. 2(B), f1-1, f1-2, f1-3, . . . denote the pixel data of the frame f1 in a line unit. In FIG. 2(C), each of the lines in the frame f1' is delayed with respect to the lines in FIG. 2(B) by one line unit.

Since the switch 3 alternately selects the terminals a and b at every line, the pixel data f01 is output as shown in FIG. 2(D). Since the switch 4 alternately selects the terminals c and d at every line, that is, the switch 4 is connected to the terminal d when the switch 3 is connected to the terminal 1 and the switch 4 is connected to the terminal c when the switch 3 is connected to the terminal b, the pixel data f10 of the line is output as shown in FIG. 2(E).

According to the present embodiment, as shown in FIG. 2(D), the pixel data f01 output from the switch 3 becomes a pixel data row in which the pixel data at odd-numbered lines in the frame f0 and the pixel data at odd-numbered lines in the frame f1 are alternately selected. In addition, as shown in FIG. 2(E), the pixel data f10 output from the switch 4 is a pixel data row in which pixel data at even-numbered lines of the frame f0 and the pixel data at odd-numbered lines of the frame f1 are alternately selected.

The pixel data f01 may be the pixel data row in which the pixel data at the odd-numbered lines of the frame f0 and the pixel data at the odd-numbered lines of the frame f1 are alternately selected, and the pixel data f10 may be the pixel data row in which the pixel data at the odd-numbered lines of the frame f0 and the pixel data at the even-numbered lines of the frame f1 are alternately selected. In the first embodiment, when the pixel data f01 is generated, odd-numbered lines among the odd-numbered lines and the even-numbered lines in the frames f0 and f1 are selected as specific lines; however, the even-numbered lines may be selected as specific lines. That is, the pixel data f01 may be the pixel data row in which the pixel data at the even-numbered lines of the frame f0 and the pixel data at the even-numbered lines of the frame f1 are alternately selected.

Figure 3:
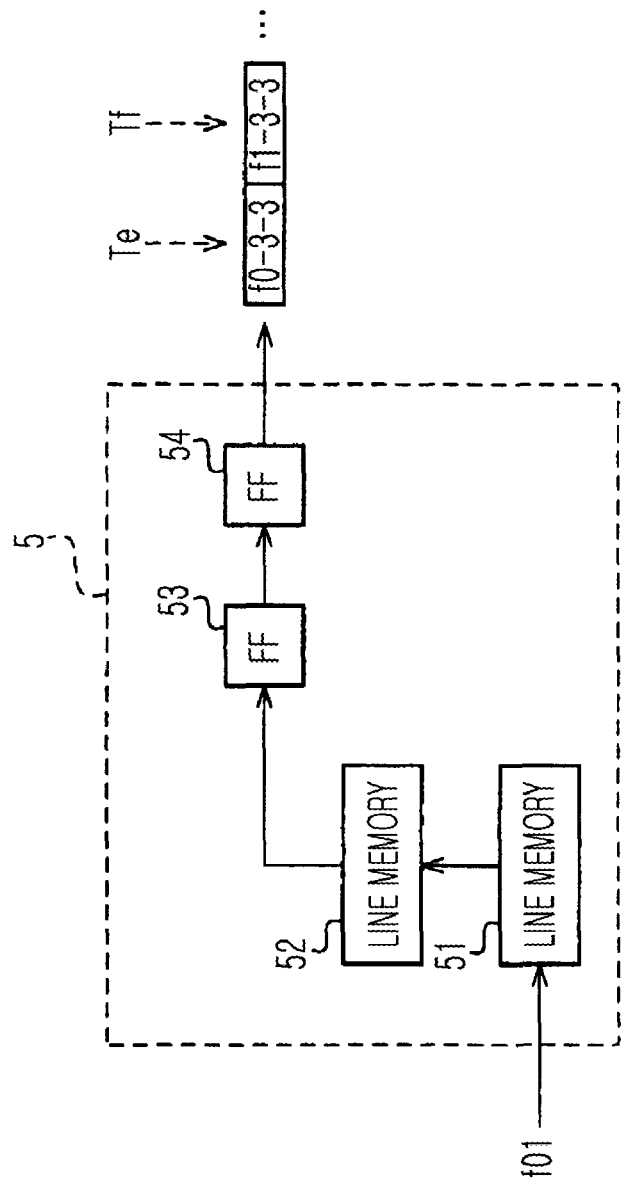
FIG. 3 is a block diagram of a starting pixel generation unit shown in FIG. 1 in detail.

The pixel data f01 output from the switch 3 is input to a starting pixel generation unit 5, and the pixel data f10 output from the switch 4 is input to a search range pixel generation unit 6. The starting pixel generation unit 5, as shown in FIG. 3, includes line memories 51 and 52, and flip-flops (FFs) 53 and 54 that are pixel delay units. The pixel data f01 of each line shown in FIG. 2(D) is sequentially delayed by the line memories 51 and 52 by one line unit, and the output from the line memory 52 is sequentially delayed by the FFs 53 and 54 by one pixel unit.

The pixel data output from the FF 54 is f0-3-3 at a timing Te and f1-3-3 at a timing Tf. The pixel data output from the FF 54 is starting pixel data when a motion vector is detected. In the pixel data represented as f0-3-3 or f1-3-3, the first f0 or f1 denotes whether the pixel data is the pixel data in the frame f0 or the frame f1. A number next to a first hyphen (that is, 3) denotes a location of the line (location in a vertical direction), and a number next to a second hyphen (that is, 3) denotes a location of the pixel (location in a horizontal direction).

Figure 4:
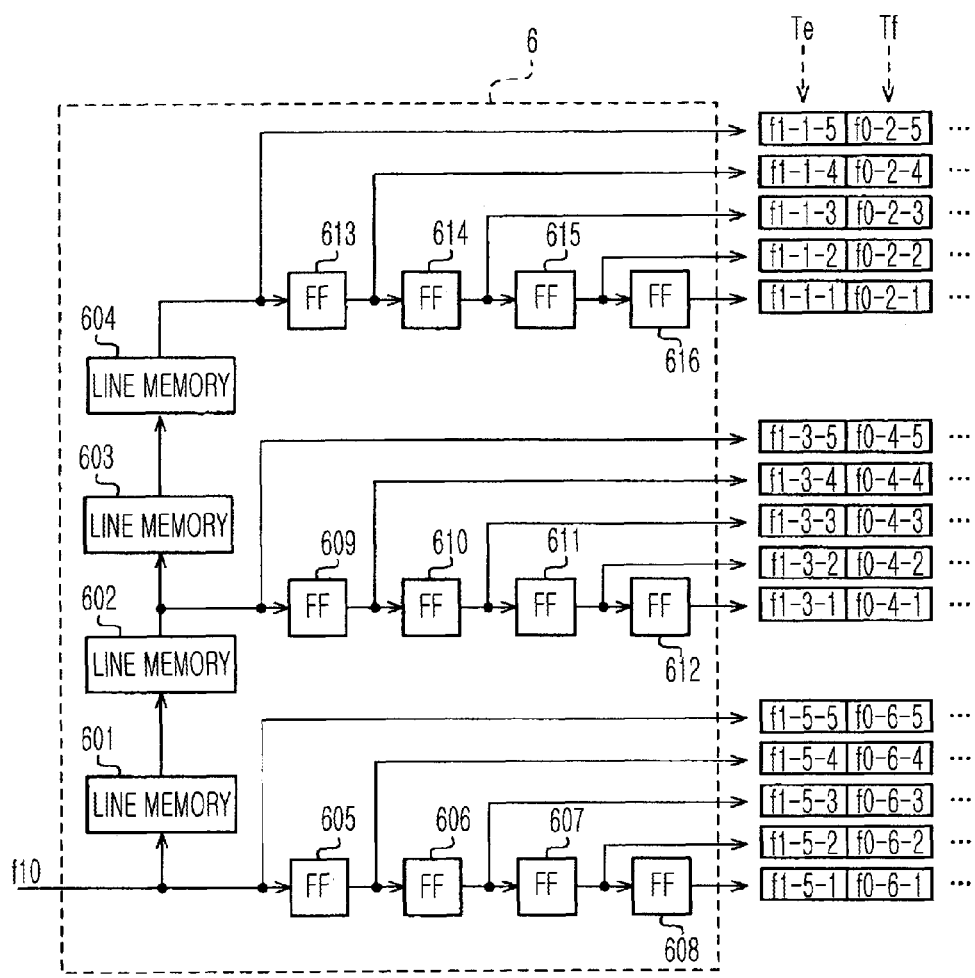
FIG. 4 is a block diagram of a search range pixel generation unit shown in FIG. 1 in detail.

The search range pixel generation unit 6 includes line memories 601 through 604, and FFs 605 through 616, as shown in FIG. 4. The pixel data f10 of each line shown in FIG. 2(E) is sequentially delayed by the line memories 601 through 604 by one line unit. In addition, the pixel data f10 is sequentially delayed by the FFs 605 through 608 by one pixel unit. The pixel data output from the line memory 602 is delayed by the FFs 609 through 612 by one pixel unit. The pixel data output from the line memory 602 is sequentially delayed by the FFs 609 through 612 by one pixel unit. The pixel data output from the line memory 604 is sequentially delayed by the FFs 613 through 616 by one pixel unit.

The search range pixel generation unit 6 shown in FIG. 4 sets five pixels, for example, in a horizontal direction and a vertical direction, that is, 25 pixels, as a search range of a motion vector. Herein, the search range of the motion vector is five pixels in the horizontal and vertical directions for simplicity; however, more pixels may actually be included in the search range. The number of pixels included in the search range in the horizontal direction may be different from the number of pixels included in the search range in the vertical direction.

At the timing Te, when it is assumed that the input pixel data f10 is pixel data f1-5-5, pixel data output from the FFs 605 through 608 are f1-5-4 through f1-5-1. The pixel data output from the line memory 602 is f1-3-5, and the pixel data output from the FFs 609 through 612 are f1-3-4 through f1-3-1. The pixel data output from the line memory 604 is f1-1-5, and the pixel data output from the FFs 613 through 616 are f1-1-4 through f1-1-1.

At the timing Tf, when it is assumed that the input pixel data f10 is pixel data f0-6-5, pixel data output from the FFs 605 through 608 are f0-6-4 through f0-6-1. The pixel data output from the line memory 602 is pixel data f0-4-5, and pixel data output from the FFs 609 through 612 are f0-4-4 through f0-4-1. The pixel data output from the line memory 604 is f0-2-5, and the pixel data output from the FFs 613 through 616 are f0-2-4 through f0-2-1.

Figure 5A:
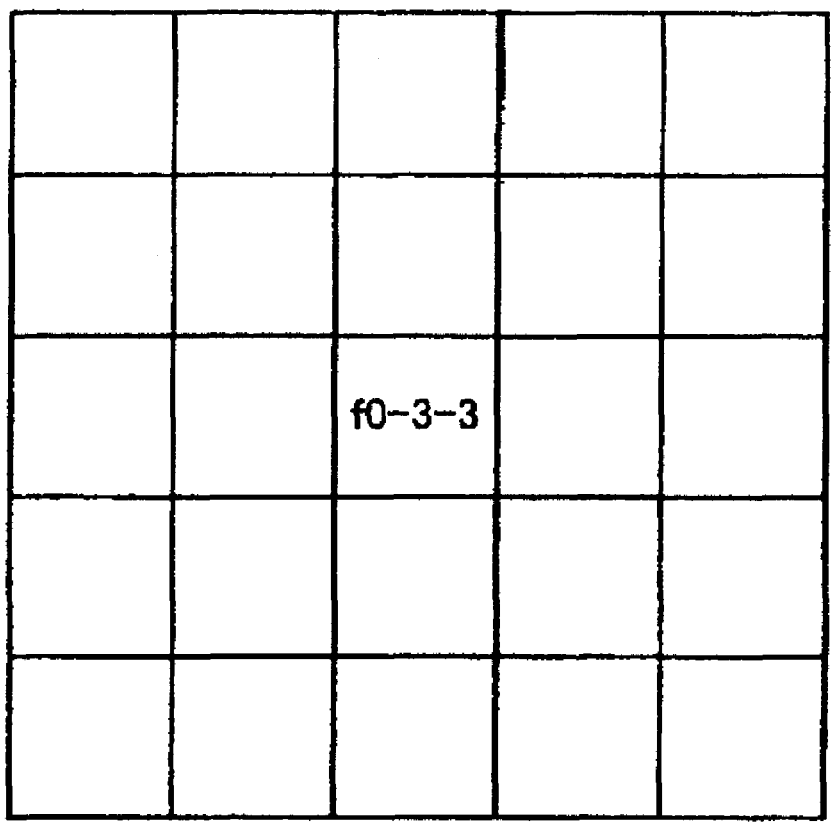

At the timing Te, a planar location of the pixel data f0-3-3 output from the starting pixel generation unit 5 shown in FIG. 3 is shown in FIG. 5A, and planar locations of the pixel data f1-1-1 through f1-1-5, f1-3-1 through f1-3-5, and f1-5-1 through f1-5-5 output from the search range pixel generation unit 6 shown in FIG. 4 are shown in FIG. 5B. The pixel data f0-3-3 and the pixel data f1-3-3 are located at the same planar location.

Figure 6A:
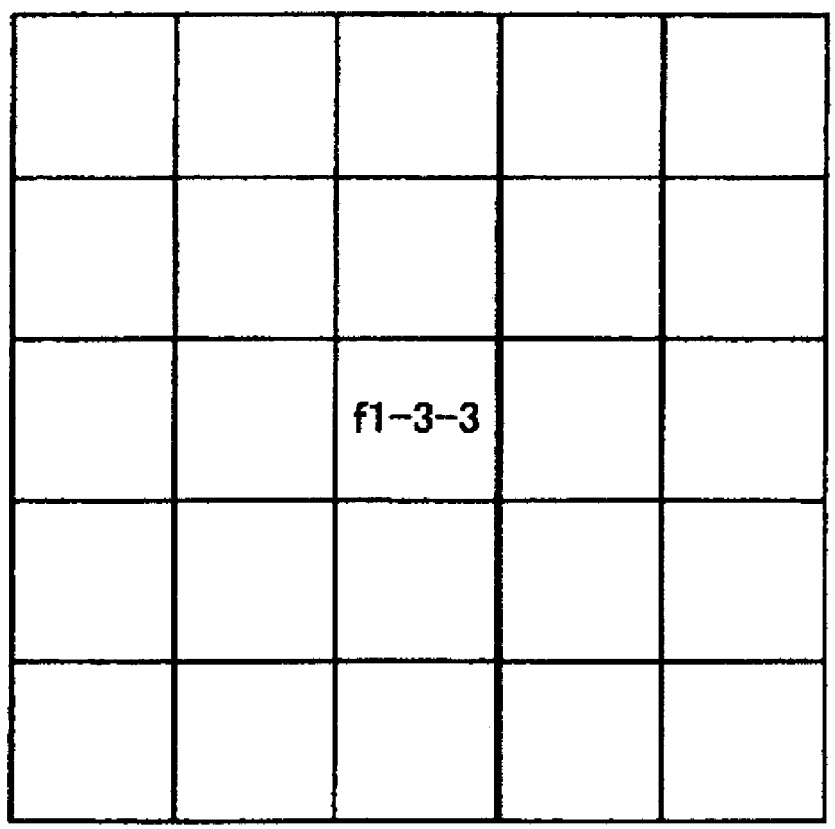

At the timing Tf, a planar location of the pixel data f1-3-3 output from the starting pixel generation unit 5 shown in FIG. 3 is shown in FIG. 6A, and planar locations of the pixel data f0-2-1 through f0-2-5, f0-4-1 through f0-4-5, and f0-6-1 through f0-6-5 output from the search range pixel generation unit 6 shown in FIG. 4 are shown in FIG. 6B. As described above, since the search range of the motion vector includes five pixels in the horizontal direction and the vertical direction, the pixel data f0-6-1 through f0-6-5 surrounded by dashed lines are not used.

Referring back to FIG. 1, the pixel data that becomes a starting pixel, which is output from the starting pixel generation unit 5, is set as starting pixel data fctr, and the pixel data in the search range of the motion vector, which is output from the search range pixel generation unit 6, is set as search range pixel data fmvs. The starting pixel data fctr and the search range pixel data fmvs are input to a motion vector candidate selection unit 7. The motion vector candidate selection unit 7 calculates differences between the starting pixel data fctr and each piece of pixel data in the search range pixel data fmvs, and selects a motion vector candidate having the smallest difference, that is, highest correlation.

Figure 7A:
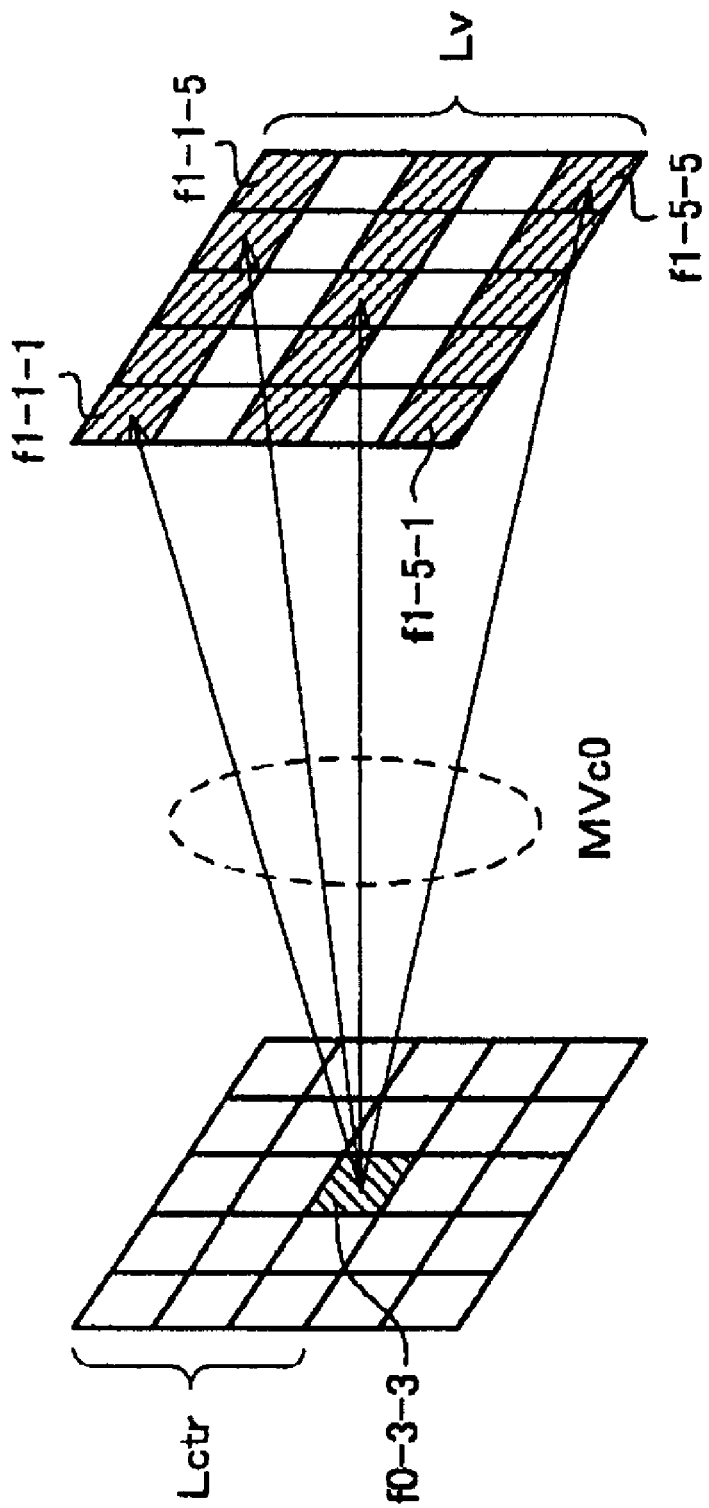
FIGS. 7A and 7B are views for describing an operation when a motion vector candidate selection unit shown in FIG. 1 generates motion vectors.

In more detail, when the pixel data in the frame f0 is the starting pixel data fctr, at a timing Te, for example, the motion vector candidate selection unit 7 calculates differences between the pixel data f0-3-3 of the frame f0 with each piece of the pixel data f1-1-1 through f1-1-5, f1-3-1 through f1-3-5, and f1-5-1 through f1-5-5 in the frame f1, as shown in FIG. 7A. In addition, the motion vector candidate selection unit 7 selects a motion vector candidate having the highest correlation among motion vector candidates MVc0 proceeding from the pixel having the pixel data f0-3-3 toward each of the pixels of the pixel data f1-1-1 through f1-1-5, f1-3-1 through f1-3-5, and f1-5-1 through f1-5-5. The selected motion vector candidate is a motion vector MV0.

Figure 7B:
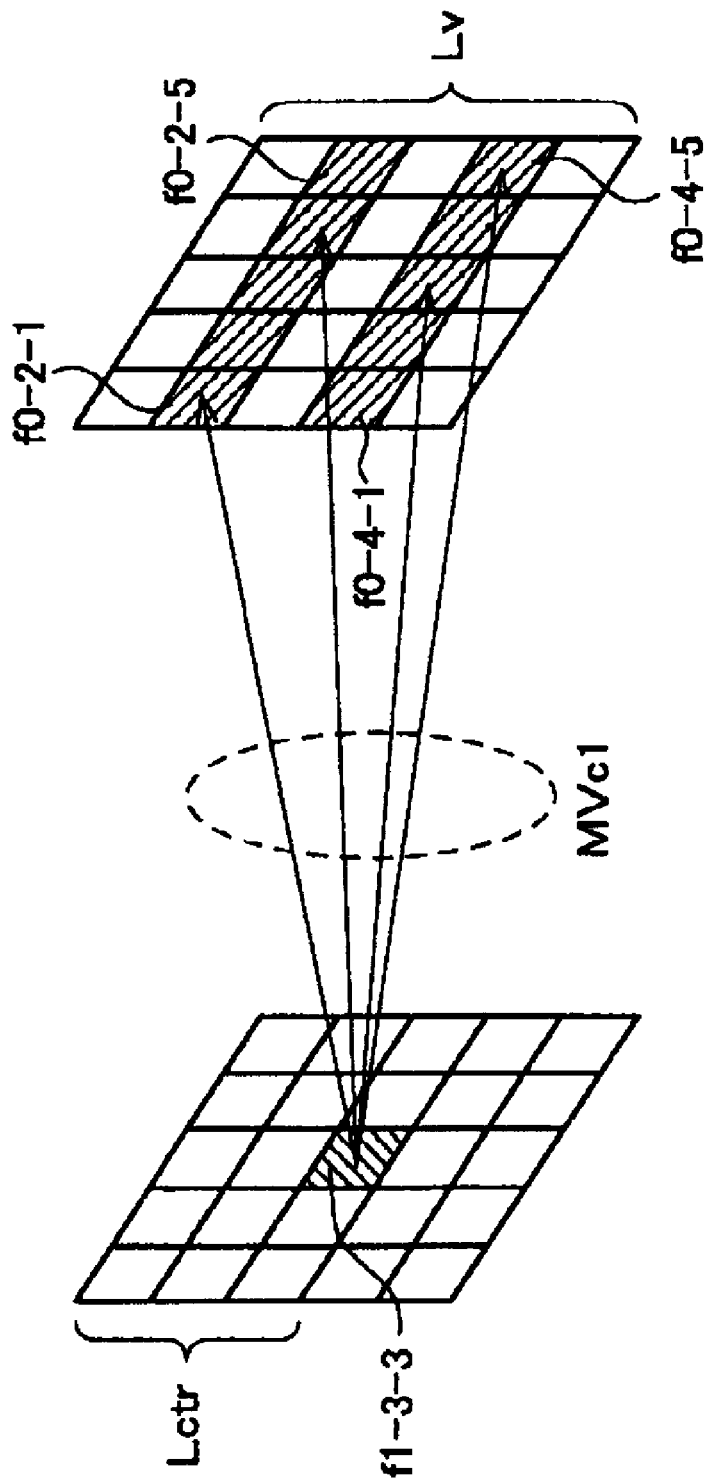

In addition, in a case where the pixel data in the frame f1 is the starting pixel data fctr at a timing Tf, for example, the motion vector candidate selection unit 7 calculates differences between the pixel data f1-3-3 of the frame f1 and each piece of the pixel data f0-2-1 through f0-2-5 and f0-4-1 through f0-4-5 of the frame f0, as shown in FIG. 7B. Then, the motion vector candidate selection unit 7 selects a motion vector candidate having the highest correlation among motion vector candidates MVc1 proceeding from the pixel of the pixel data f1-3-3 toward each of the pixels of the pixel data f0-2-1 through f0-2-5 and f0-4-1 through f0-4-5. The selected motion vector candidate is a motion vector MV1.

In FIGS. 7A and 7B, only some of the motion vector candidates MVc0 and MVc1 are shown for the convenience of description. In addition, in FIGS. 7A and 7B, in a case where the pixel data in the frame f0 is set as the starting pixel data fctr and a case where the pixel data in the frame f1 is set as the starting pixel data fctr, the frame including the starting pixel data fctr is shown at a left side so as to allow a viewer to understand that the search range pixel data fmvs does not match with the starting pixel data fctr in the line direction. In FIG. 7A, time elapses from a left side toward a right side, and in FIG. 7B, time elapses from a right side toward a left side.

The line memories 601 through 604 shown in FIG. 4 determine the number of lines (Lv) within the search ranges of the motion vector candidates MVc0 and MVc1 shown in FIGS. 7A and 7B in a vertical direction. The number of line memories in the search range pixel generation unit 6 is determined depending on the number of lines Lv in the vertical direction of the search ranges of the motion vector candidates MVc0 and MVc1. The line memories 51 and 52 shown in FIG. 3 make the starting pixel data fctr move by as much as lines Lctr, which is half of the search range in the vertical direction, so that the starting pixel data fctr may be located at a center of the search range in the vertical direction. The number of line memories in the starting pixel generation unit 5 is also determined according to the number of lines Lv in the vertical direction of the search ranges of the motion vector candidates MVc0 and MVc1.

As clearly shown when comparing FIG. 3 and FIG. 4 with each other, the number of line memories in the starting pixel generation unit 5 is half the number of line memories in the search range pixel generation unit 6.

The motion vector candidate selection unit 7 outputs the motion vector MV0 and the motion vector MV1 alternately at every line. The motion vectors MV0 and MV1 output from the motion vector candidate selection unit 7 are input to a correlation comparing unit 8.

Figure 8:
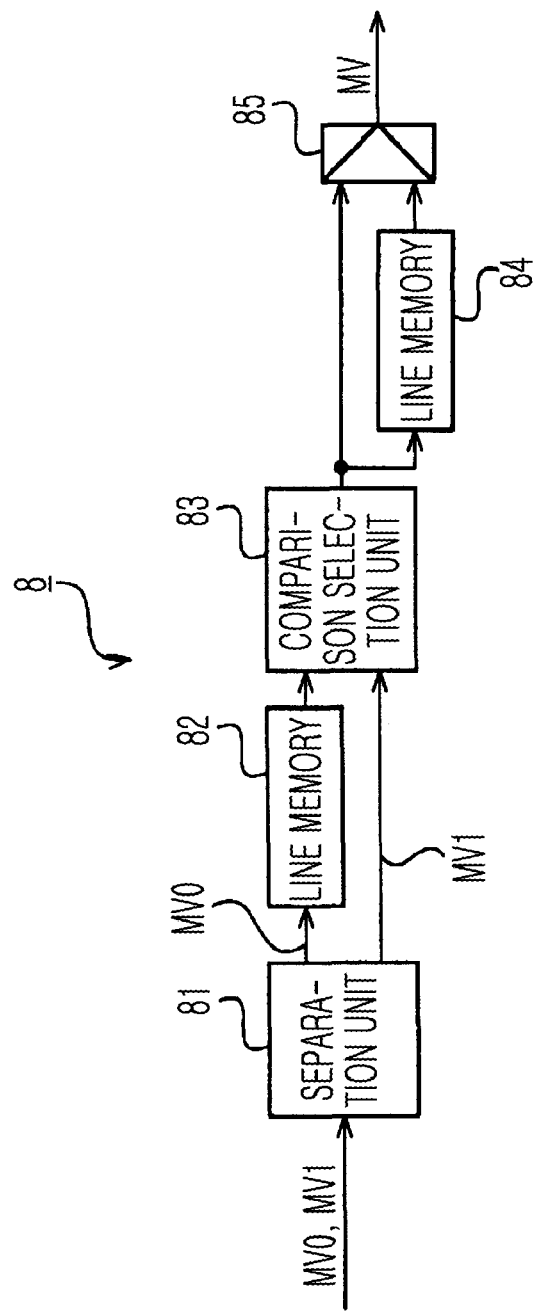
FIG. 8 is a block diagram of a correlation comparing unit shown in FIG. 1 in more detail.
Figure 9:
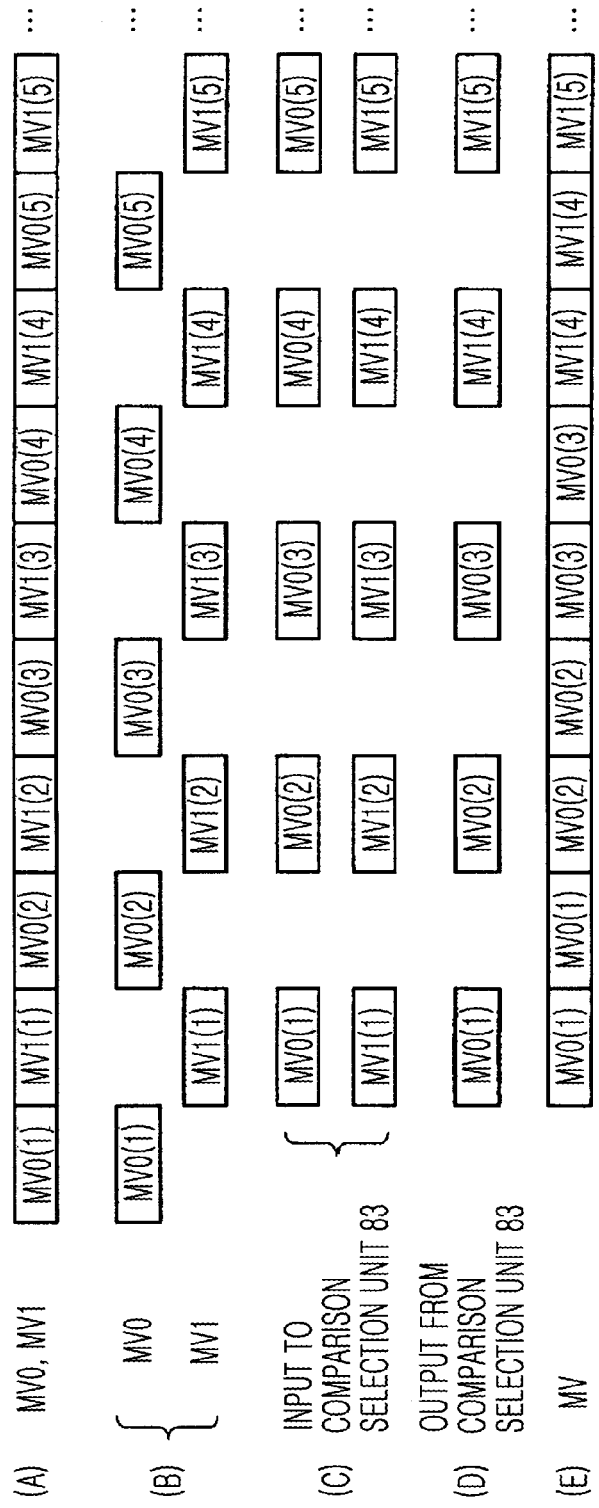
FIG. 9 is a view for describing operations of the correlation comparing unit shown in FIG. 8.

Detailed structure and operations of the correlation comparing unit 8 are described with reference to FIGS. 8 and 9A through 9E. In FIG. 8, the motion vectors MV0 and MV1 are alternately output at every line as shown in FIG. 9(A). The motion vector MV0 that is output once for period of two lines is sequentially referred to as MV0(1), MV0(2), MV0(3), MV0(4), . . . , and the motion vector MV1 that is output once for period of two lines is sequentially referred to as MV1(1), MV1(2), MV1(3), MV1(4), . . . . The motion vectors MV0 and MV1 are output to a separation unit 81. The separation unit 81 alternately selects the motion vector MV0 and the motion vector MV1 at every line, and separates the motion vector MV0 and the motion vector MV1 as shown in FIG. 9(B).

The motion vector MV0 output from the separation unit 81 is input to a line memory 82, and then, is delayed for one line period and is input to a comparison selection unit 83. The motion vector MV1 is input to the comparison selection unit 83. FIG. 9(C) shows the motion vector MV0 that is delayed for one line period and the motion vector MV1, wherein the motion vectors MV0 and MV1 are input to the comparison selection unit 83. Timings of the motion vectors MV0 and MV1 that are input to the comparison selection unit 83 match with each other.

The comparison selection unit 83 compares the motion vector MV0 with the motion vector MV1, and selects one having higher correlation and outputs the selected motion vector. FIG. 9(D) shows examples of the motion vector selected and output by the comparison selection unit 83. The motion vector MV0, that is, MV0(1), MV0(2), and MV0(3) are selected successively, and then, the motion vector MV1, that is, MV1(4) and MV1(5) are successively selected. The motion vector output from the comparison selection unit 83 is input to a line memory 84 and a toggle switch 85.

The line memory 84 delays the input motion vector for one line period. The toggle switch 85 alternately selects the motion vectors output from the comparison selection unit 83 and the motion vector that is delayed for one line period and output from the line memory 84, and then, outputs the motion vector MV shown in FIG. 9(E).

As described above, the correlation comparing unit 8 compares the motion vector MV0 with the motion vector MV1 once for the period of two lines period, and outputs one of the motion vectors MV0 and MV1, which is determined to have higher correlation, as the motion vector MV, successively for the period of the two lines. The motion vector MV is input to the interpolation pixel generation unit 9.

Although not shown in the drawings, the interpolation pixel generation unit 9 includes a plurality of line memories and a plurality of FFs, delays the input pixel data of the frame f0 and the input pixel data of the frame f1 in the horizontal and vertical directions, and generates pixel data of a predetermined range in the horizontal and vertical directions for generating interpolation pixel data. In addition, the interpolation pixel generation unit 9 selects pixel data respectively among the plurality of pixel data in the frame f0 and among the plurality of pixel data in the frame f1 based on the input motion vector MV, and averages selected pixel data to generate interpolation pixel data Pi.

Since each piece of the pixel data of the frame f0 and each piece of the pixel data of the frame f1 are sequentially input to the interpolation pixel generation unit 9, the interpolation pixel generation unit 9 sequentially generates the interpolation pixel data Pi forming each of the interpolation frames that are interpolated respectively in the frame f0 and the frame f1. The interpolation frame formed by the interpolation pixel data Pi output from the interpolation pixel generation unit 9 is referred to as an interpolation frame f0.5.

Each piece of the pixel data of the frame f0 and each piece of the pixel data (interpolation pixel data Pi) of the interpolation frame f0.5 are input to the frame frequency conversion unit 10. The frame frequency conversion unit 10 alternately outputs the interpolation frame f0.5 and the frame f0 in the stated order at a frame frequency that is twice of the input image signal Sin. Accordingly, the frame frequency conversion unit 10 outputs an image signal Sout, in which the interpolation frame is interpolated between the frame f0 and the frame f1 and a frame frequency is twice of the image signal Sin.

As described above, each of the components in the motion vector detecting apparatus according to the first embodiment operates as follows: The starting pixel generation unit 5 generates the starting pixel data fctr for detecting the motion vector MV based on the pixel data in a first frame (frame f0) or in a second frame (frame f1) that is front or rear frames in a timing order. The search range pixel generation unit 6 generates a plurality of pieces of search range pixel data fmvs included in predetermined search ranges in the horizontal and vertical directions for detecting the motion vector MV, based on the pixel data in the second frame when the starting pixel generation unit 5 generates the starting pixel data fctr based on the pixel data in the first frame, and based on the pixel data in the first frame when the starting pixel generation unit 5 generates the starting pixel data fctr based on the pixel data in the second frame.

The switch 3 functions as a first switching unit for switching alternately and repeatedly between a state where the starting pixel generation unit 5 generates the starting pixel data fctr based on the pixel data of a selected line between odd-numbered and even-numbered lines in the first frame and a state where the starting pixel generation unit 5 generates the starting pixel data fctr based on the pixel data of the selected line in the second frame, at every line in the first and second frames.

The switch 4 functions as a second switching unit for switching alternately and repeatedly between a state where the search range pixel generation unit 6 generates the search range pixel data fmvs based on the pixel data of one line between odd-numbered and even-numbered lines in the first frame and a state where the search range pixel generation unit 6 generates the search range pixel data fmvs based on the pixel data of other line of odd-numbered and even-numbered lines in the second frame, at every line in the first and second frames.

The motion vector candidate selection unit 7 selects a motion vector candidate having the highest correlation among a plurality of motion vector candidates MVc0 connecting the starting pixel data fctr and each of the search range pixel data fmvs to each other as a motion vector MV0 (a first motion vector), when the starting pixel generation unit 5 generates the starting pixel data fctr based on the pixel data in the first frame by the switching of the first switching unit and when the search range pixel generation unit 6 generates the search range pixel fmvs based on the pixel data in the second frame by the switching of the second switching unit.

In addition, the motion vector candidate selection unit 7 selects a motion vector candidate having the highest correlation among a plurality of motion vector candidates MVc1 connecting the starting pixel data fctr and each of the search range pixel data fmvs to each other as a motion vector MV1 (a second motion vector), when the starting pixel generation unit 5 generates the starting pixel data fctr based on the pixel data in the second frame by the switching of the first switching unit and when the search range pixel generation unit 6 generates the search range pixel fmvs based on the pixel data in the first frame by the switching of the second switching unit.

The correlation comparing unit 8 selects a motion vector having higher correlation by comparing the motion vector MV0 with the motion vector MV1, and outputs the selected motion vector as the motion vector MV.

As described above, according to the first embodiment, the motion vectors MV0 and MV1 may be detected based on each of the frames f0 and f1 that are front and rear frames, and thus, the motion vector having higher correlation may be set as a final motion vector MV. Therefore, false detection of the motion vector MV may be greatly reduced. According to the first embodiment, only one circuit is necessary for detecting the motion vector and increase of a circuit scale is very small, and thus, costs rarely increase.

According to the first embodiment, one of an odd-numbered vector and even-numbered vector in the motion vector MV in the vertical direction is omitted. However, frequently, the motion vector is detected by thinning out the pixels by half in the vertical direction. When the motion vector detecting apparatus according to the first embodiment is compared with the motion vector detecting apparatus for detecting the motion vector by thinning out the pixels by half in the vertical direction, capacities of detecting the motion vector are the same. Therefore, omitting one of the odd-numbered vector and the even-numbered vector actually causes no problem.

Second Embodiment

A second embodiment of the present invention will be described with reference to FIG. 10. In FIG. 10, the same reference numerals are used for the same components as those of FIG. 1, and descriptions thereof are omitted. In FIG. 10, each piece of pixel data of the frame f0 is input to the line memory 2, and the line memory 2 delays the pixel data of each line in the frame f0 for one line period and outputs the frame f0 as a frame f0'.

The pixel data of the frame f0 is input to a terminal a of the switch 3, and the pixel data of the frame f1 is input to a terminal b of the switch 3. The pixel data of the frame f0' output from the line memory 2 is input to a terminal c of the switch 4, and the pixel data of the frame f1 is input to a terminal d of the switch 4.

The switch 3 outputs the pixel data f01 by switching the terminals a and b at every line, and the switch 4 outputs the pixel data f10 by switching the terminals c and d at every line, like in FIG. 1. Since the pixel data input to the switches 3 and 4 of FIG. 1 and the pixel data input to the switches 3 and 4 of FIG. 10 are different from each other, pixel data rows output as the pixel data f01 and f10 in the FIG. 1 become different from that in the FIG. 10.

Figure 11:
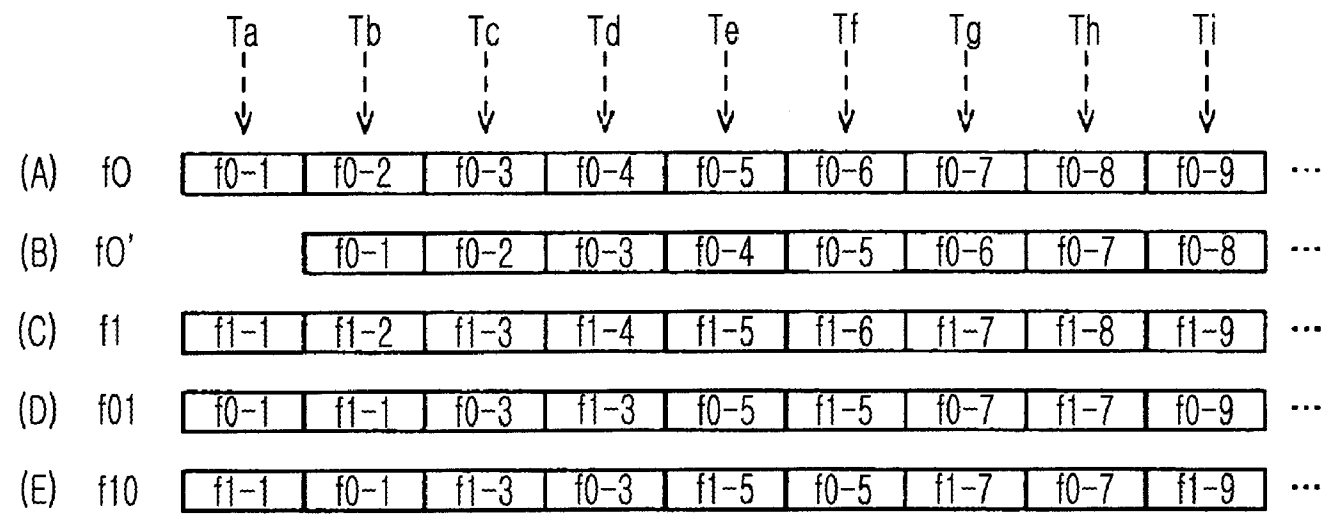

The pixel data f01 and f10 output from the switches 3 and 4 will be described with reference to FIG. 11. In FIG. 11(A), f0-1, f0-2, f0-3, . . . denote the pixel data of the frame f0 by a line unit. In FIG. 11(B), each of the lines of the frame f0' is delayed from that of FIG. 11(A) for one line period. In FIG. 11(C), f1-1, f1-2, f1-3, . . . denote the pixel data of the frame f1 by a line unit.

Since the switch 3 alternately selects one of the terminals a and b at every line, the pixel data f01 of each line is output as shown in FIG. 11(D). Since the switch 4 alternately selects the terminals c and d at every line so as to connect to the terminal d when the switch 3 is connected to the terminal a and to connect to the terminal c when the switch 3 is connected to the terminal b, the pixel data f10 of each of the lines is output as shown in FIG. 11(E).

In the second embodiment, as shown in FIG. 11(D), the pixel data f01 output from the switch 3 is pixel data row including the pixel data of the odd-numbered lines of the frame f0 and the pixel data of the odd-numbered lines of the frame f1 that are alternately selected. Also, as shown in FIG. 11(E), the pixel data f10 output from the switch 4 is pixel data row including the pixel data of the odd-numbered lines in the frame f0 and the pixel data of the odd-numbered lines in the frame f1 that are alternately selected.

The pixel data f01 may be the pixel data row including the pixel data of the even-numbered lines in the frame f0 and the pixel data of the even-numbered lines in the frame f1 that are alternately selected, and the pixel data f10 may be the pixel data row including the pixel data of the even-numbered lines in the frame f0 and the pixel data of the even-numbered lines in the frame f1 that are alternately selected.

Operations of the starting pixel generation unit 5 and the search range pixel generation unit 6 of FIG. 10 are the same as those of FIG. 1. In the second embodiment, since the pixel data f01 output from the switch 3 is the pixel data row shown in FIG. 11(D) and the pixel data f10 output from the switch 4 is the pixel data row shown in FIG. 11(E), the starting pixel data fctr output from the starting pixel generation unit 5 and the search range pixel data fmvs output from the search range pixel generation unit 6 have the following positional relation.

Figure 12A:
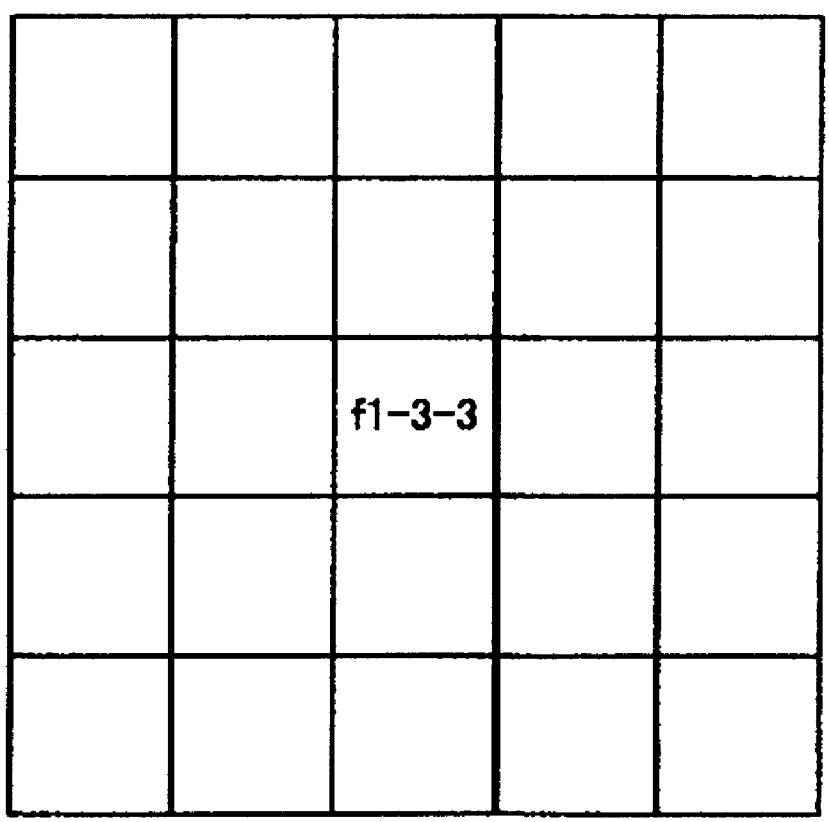

For example, at the timing Te, the positional relation is the same as that of FIGS. 5A and 5B, like in the first embodiment. At the timing Tf, the positional relation is as shown in FIGS. 12A and 12B, unlike the relation shown in FIGS. 6A and 6B described in the first embodiment.

Figure 13A:
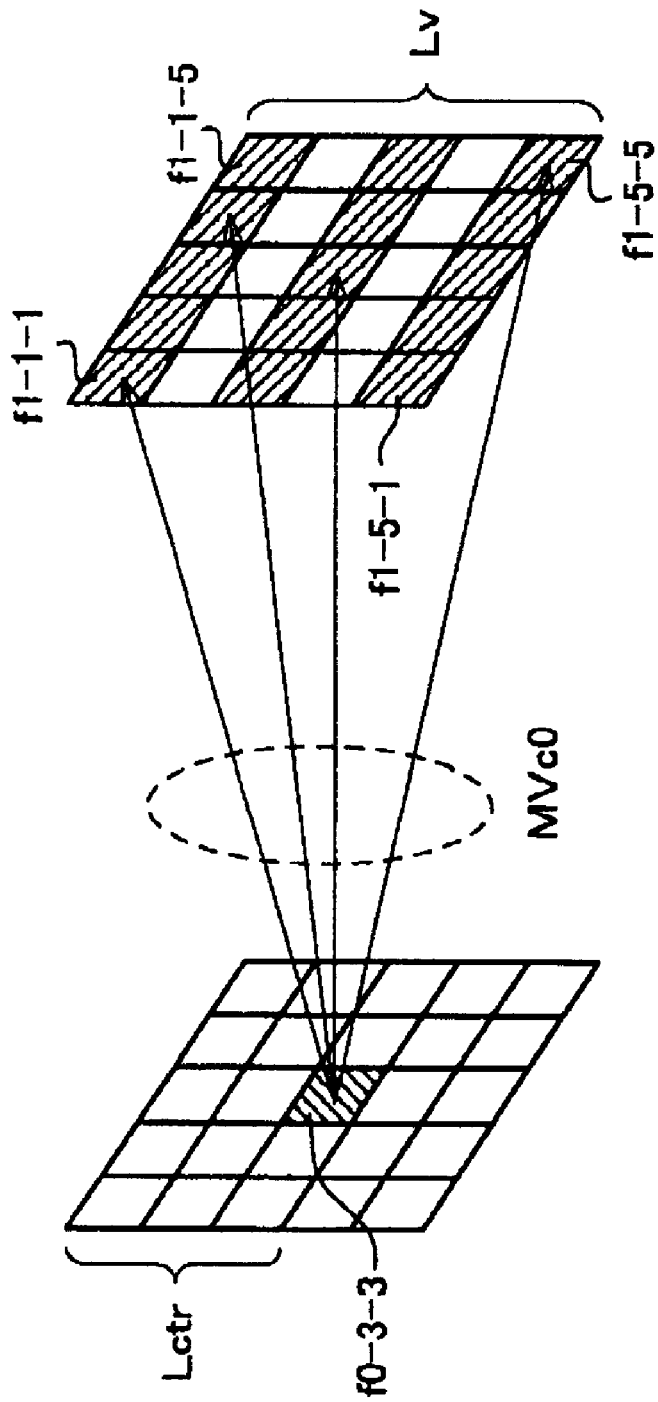
FIGS. 13A and 13B are views for describing operations when a motion vector candidate selection unit of FIG. 10 generates motion vectors MV0 and MV1.

Therefore, according to the second embodiment, in a case where the pixel data in the frame f0 is the starting pixel data fctr, the motion vector candidate selection unit 7 calculates differences between the pixel data f0-3-3 of the frame f0 and each piece of the pixel data f1-1-1 through f1-1-5, f1-3-1 through f1-3-5, and f1-5-1 through f1-5-5 of the frame f1 at the timing Te, for example, as shown in FIG. 13A. In addition, the motion vector candidate selection unit 7 selects a motion vector candidate having the highest correlation among motion vector candidates MVc0 proceeding from the pixel having the pixel data f0-3-3 toward each of the pixels of the pixel data f1-1-1 through f1-1-5, f1-3-1 through f1-3-5, and f1-5-1 through f1-5-5. The selected motion vector candidate is a motion vector MV0.

Figure 13B:
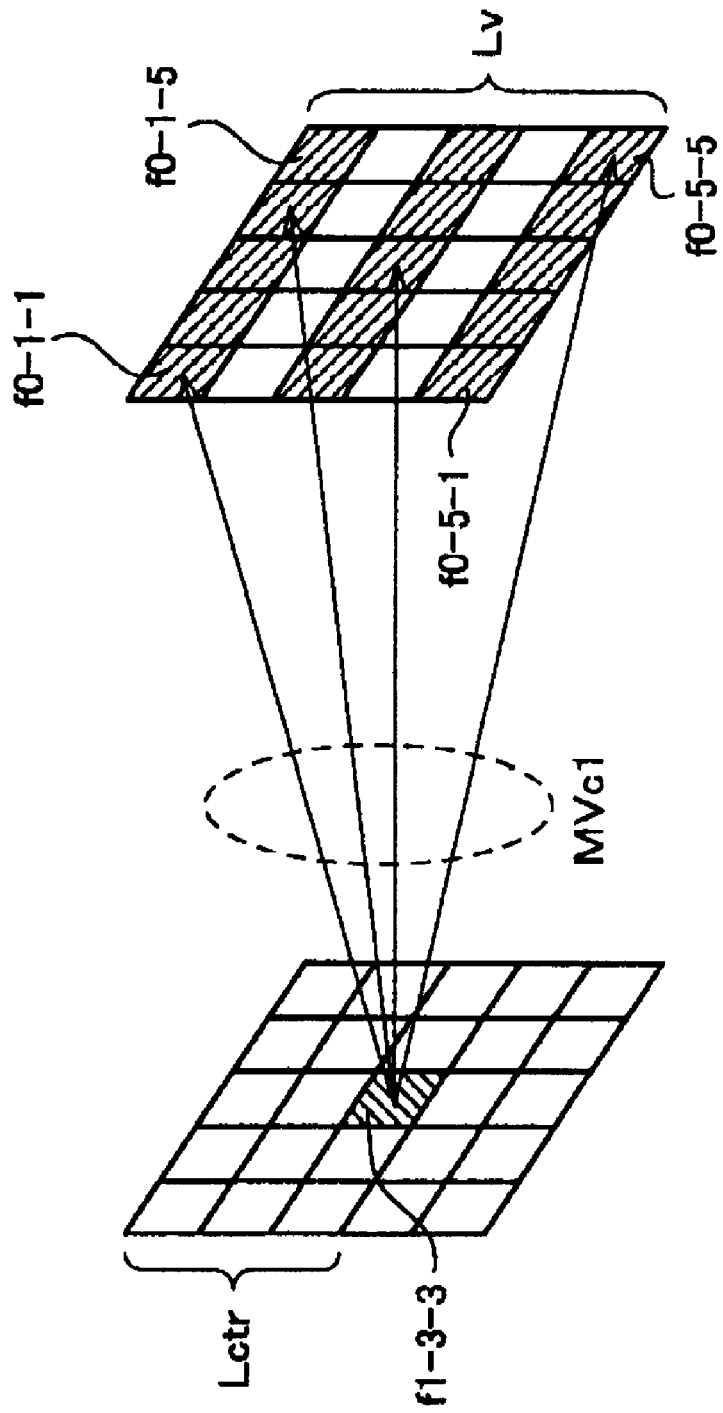

Also, in a case where the pixel data in the frame f1 is the starting pixel data fctr, at the timing Tf, for example, the motion vector candidate selection unit 7 calculates differences between the pixel data f1-3-3 of the frame f1 and each piece of the pixel data f0-1-1 through f0-1-5, f0-3-1 through f0-3-5, and f0-5-1 through f0-5-5 of the frame f1, as shown in FIG. 13B. Then, the motion vector candidate selection unit 7 selects a motion vector candidate having the highest correlation among motion vector candidates MVc1 proceeding from the pixel of the pixel data f1-3-3 toward each of the pixels of the pixel data f0-1-1 through f0-1-5, f0-3-1 through f0-3-5, and f0-5-1 through f0-5-5. The selected motion vector candidate is a motion vector MV1.

As described above, according to the second embodiment, in any of the cases where the pixel data in the frame f0 is the starting pixel data fctr and where the pixel data in the frame f1 is the starting pixel data fctr, the motion vectors MV0 and MV1 are detected by using the pixel data of only one of the odd-numbered line and the even-numbered line in the vertical direction of the search range of the motion vector candidates MVc0 and MVc1.

As described above, each of the components in the motion vector detecting apparatus according to the second embodiment operates as follows: Differences from the motion vector detecting apparatus of the first embodiment will be described, that is, the switch 4 functions as a second switching unit for switching alternately and repeatedly between a state where the search range pixel generation unit 6 generates the search range pixel data fmvs based on the pixel data of a selected line in the first frame, which is the same as the line selected by the starting pixel generation unit 5, and a state where the search range pixel generation unit 6 generates the search range pixel data fmvs based on the pixel data of the selected line in the second frame.

According to the second embodiment, in both cases where the pixel data in the frame f0 is the starting pixel data fctr and where the pixel data in the frame f1 is the starting pixel data fctr, one of the odd-numbered vector and the even-numbered vector of the motion vector MV in the vertical direction is omitted. In the example shown in FIGS. 13A and 13B, since the odd-numbered vector is omitted, in both cases where the pixel data in the frame f0 is the starting pixel data fctr and where the pixel data in the frame f1 is the starting pixel data fctr, the odd-numbered motion vector in the vertical direction cannot be detected. If the even-numbered vector is omitted, the even-numbered motion vector in the vertical direction cannot be detected.

However, according to the second embodiment, in both cases where the pixel data in the frame f0 is the starting pixel data fctr and where the pixel data in the frame f1 is the starting pixel data fctr, one of the odd-numbered motion vectors and even-numbered motion vectors in the vertical direction can be detected. Therefore, according to the second embodiment, one of the even-numbered motion vectors and odd-numbered motion vectors in the vertical direction can be detected more accurately than the above first embodiment. In the second embodiment, omitting one of the odd-numbered vector and the even-numbered vector does not matter actually.

Third Embodiment

A third embodiment of the present invention will be described with reference to FIG. 14. According to the third embodiment shown in FIG. 14, the line memory is deleted by using a frame memory 12 having a capacity corresponding to two frames instead of using the frame memory 1 of FIG. 1, and the starting pixel generation unit 5 is deleted by studying a method of reading pixel data.

Figure 14:
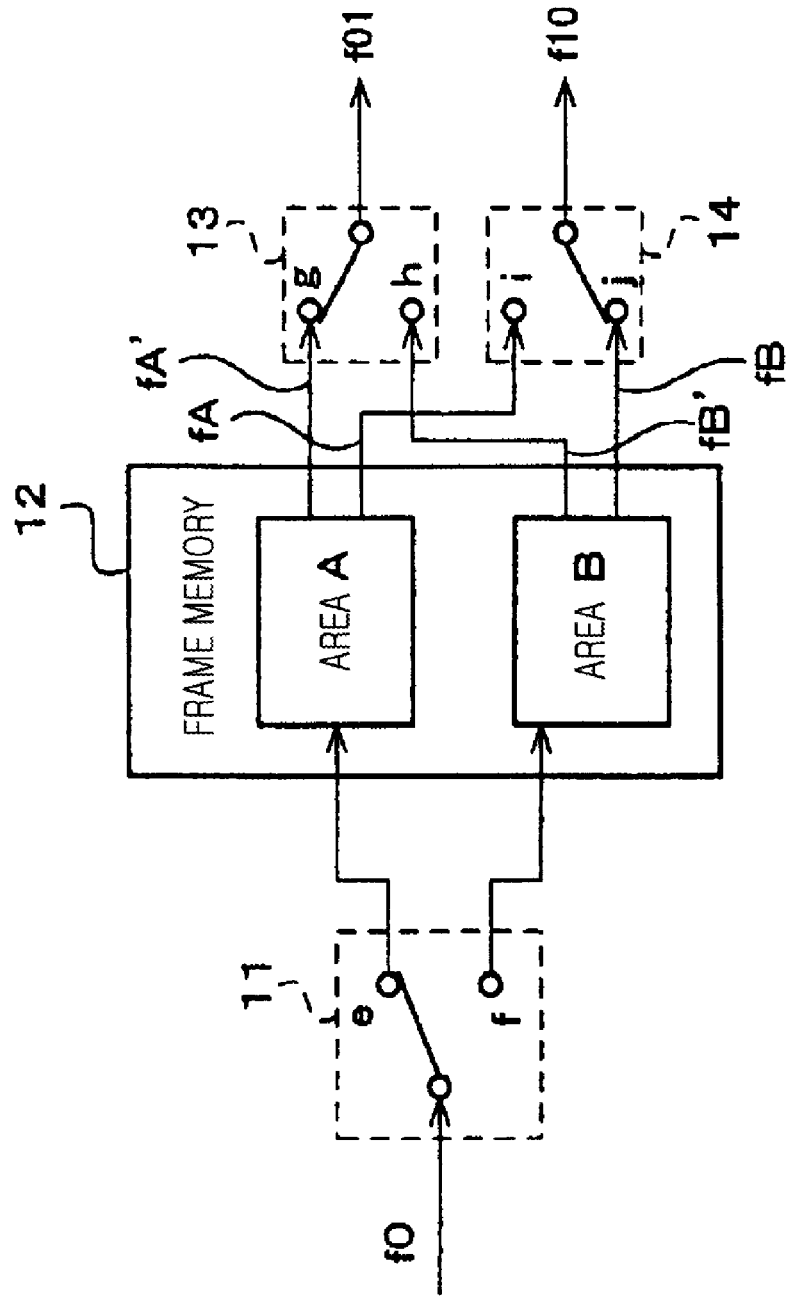
FIG. 14 is a partial block diagram of a motion vector detecting apparatus according to a third embodiment and a fourth embodiment of the present invention.

In FIG. 14, each piece of pixel data in the frame f0 is input to a switch 11. The switch 11 is newly provided in FIG. 14. The frame memory 12 has an area A and an area B, each having a capacity corresponding to one frame. The switch 11 switches to terminals e and f alternately at every frame. Therefore, the pixel data written in each of the areas A and B is updated once in two frames.

Switches 13 and 14 are provided at output terminals of the frame memory 12. The switches 13 and 14 are used instead of the switches 3 and 4 of FIG. 1. Pixel data fA' output from the area A is input to a terminal g of the switch 13, and pixel data fB' output from the area B is input to a terminal h of the switch 13. Pixel data fA output from the area A is input to a terminal i of the switch 14, and pixel data fB output from the area B is input to a terminal j of the switch 14.

The switch 13 alternately selects the terminals g and h at every line, and thus, outputs pixel data f01 by reading odd-numbered lines from both of the frames f0 and f1. The switch 14 alternately selects the terminals i and j at every line, and outputs pixel data f10 by reading even-numbered lines from the frame f0 and reading odd-numbered lines from the frame f1. When the switch 13 is connected to the terminal g, the switch 14 is connected to the terminal j, and when the switch 13 is connected to the terminal h, the switch 14 is connected to the terminal i.

Figure 15:
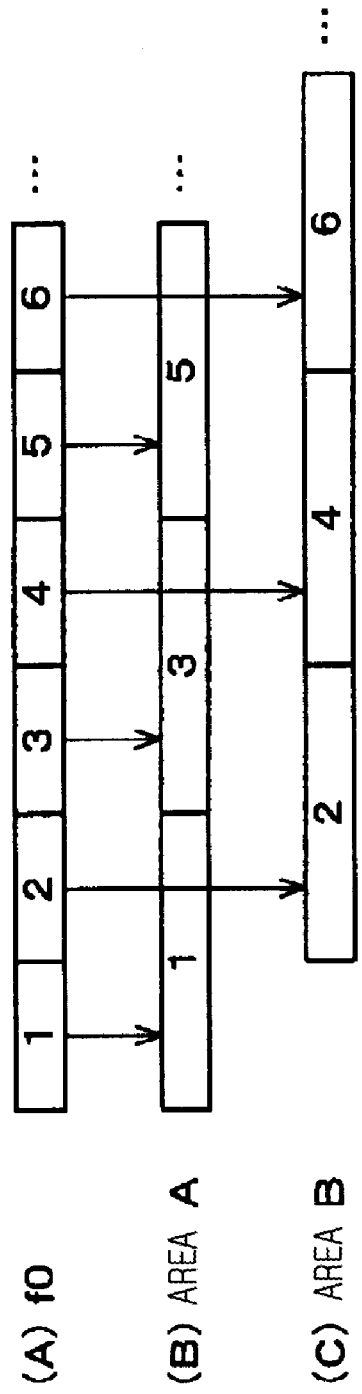
FIG. 15 is a view for describing an operation of writing pixel data on a frame memory shown in FIG. 14.

FIG. 15 shows states of frames written in the area A and the area B of the frame memory 12. As shown in FIG. 15(A), the frame f0 proceeds to 1, 2, 3, . . . . As shown in FIG. 15(B), when the frame f0 is 1, 3, 5, . . . , the pixel data is written in the area A. As shown in FIG. 15(C), when the frame f0 is 2, 4, 6, . . . , the pixel data is written in the area B. The areas A and B hold the pixel data respectively for a two-frame period.

In FIG. 14, the lines of the pixel data fA' and fB', which are the same as those of the pixel data fA and fB, are output at a timing when the pixel data of the frame f0 is written in the areas A and B, and the lines of the pixel data fA' and fB', which are delayed from the lines of the pixel data fA and fB for one line period, are output at a timing when the pixel data of the frame f0 is not written. Controlling of the output of the pixel data fA' and fB' may be easily realized by using an address control with respect to the frame memory 12, or by using a line memory and a selector.

Figure 16:
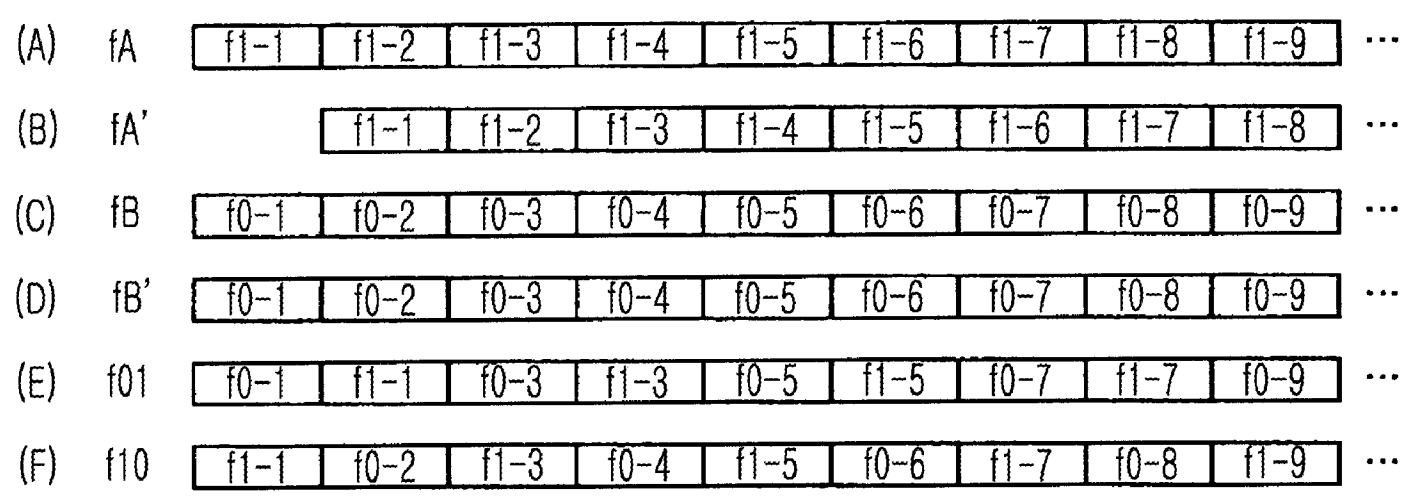

FIG. 16 shows states of pixel data fA, fA', fB, fB', f01, and f10 when the frame f0 is 2, 4, 6, . . . . When the frame f0 is 2, 4, 6, . . . , as shown in FIG. 15, the pixel data of the frame f0 is not written in the area A but in the area B. Therefore, as shown in FIGS. 16(A) and 16(B), the pixel data fA' is delayed from the pixel data fA for one line period, and as shown in FIGS. 16(C) and 16(D), the pixel data fB' is the same as the pixel data fB.

Since the switch 13 alternately selects the terminals g and h at every line and accordingly the switch 14 alternately selects the terminals j and i, the pixel data f01 output from the switch 13 is as shown in FIG. 16(E) and the pixel data f10 output from the switch 14 is as shown in FIG. 16(F).

FIG. 17 shows states of the pixel data fA, fA', fB, fB', f01, and f10 when the frame f0 is 3, 5, 7, . . . . When the frame f0 is 3, 5, 7, . . . , as shown in FIG. 15, the pixel data of the frame f0 is written in the area A and not in the area B. Therefore, as shown in FIGS. 17(A) and 17(B), the pixel data fA' has the same lines as those of the pixel data fA, and as shown in FIGS. 17(C) and 17(D), the pixel data fB' is delayed from the pixel data fB for one line period.

Since the switch 13 alternately selects the terminals g and h at every line and accordingly the switch 14 alternately selects the terminals j and i, the pixel data f01 output from the switch 13 is as shown in FIG. 17(E) and the pixel data f10 output from the switch 14 is as shown in FIG. 17(F).

As described above, according to the third embodiment, the pixel data f01 output from the switch 13 is the pixel data row including the pixel data of the odd-numbered lines of the frame f0 and the pixel data of the odd-numbered lines of the frame f1, which are alternately selected, and the pixel data f10 output from the switch 14 is the pixel data row including the pixel data of the even-numbered lines of the frame f0 and the pixel data of the odd-numbered lines of the frame f1, which are alternately selected.

In the third embodiment, the pixel data f01 may be the pixel data row including the pixel data of the odd-numbered lines of the frame f0 and the pixel data of the odd-numbered lines of the frame f1, which are alternately selected, and the pixel data f10 may be the pixel data row including the pixel data of the odd-numbered lines of the frame f0 and the pixel data of the even-numbered lines of the frame f1, which are alternately selected. The pixel data f01 may be the pixel data row including the pixel data of the even-numbered lines of the frame f0 and the pixel data of the even-numbered lines of the frame f1, which are alternately selected.

According to the third embodiment, the pixel data corresponding to the starting pixel data fctr output from the starting pixel generation unit 5 of FIG. 1 can be directly read from the frame memory 12, and thus, the starting pixel generation unit 5 may be omitted. Operations of the search range pixel generation unit 6, the motion vector candidate selection unit 7, the correlation comparing unit 8, the interpolation pixel generation unit 9, and the frame frequency conversion unit 10 are the same as those of FIG. 1, and thus, descriptions thereof are not provided here. The motion vector detecting apparatus according to the third embodiment has the same effects as those of the first embodiment.

In the third embodiment, operations that are substantially the same as those of the starting pixel generation unit 5 are performed through controlling of a reading operation from the frame memory 12 by using the frame memory 12 shown in FIG. 14. Therefore, the frame memory 12 functions as a starting pixel generation unit that generates the starting pixel data fctr when detecting the motion vector MV based on the pixels in a first frame (frame f0) or a second frame (frame f1) that is front or rear frame in a timing order.

The switch 13 functions as a first switching unit for switching alternately and repeatedly between a state where the starting pixel data fctr is generated based on the pixel data of one selected from the odd-numbered line and the even-numbered line in the first frame and a state where the starting pixel data fctr is generated based on the pixel data of the selected line in the second frame, at every line in the first and second frames.

The switch 14 functions as a second switching unit for switching alternately and repeatedly between a state where the search range pixel data fmvs is generated based on the pixel data of one line selected from the odd-numbered line and the even-numbered line in the first frame and a state where the search range pixel data fmvs is generated based on the other line between the odd-numbered line and the even-numbered line in the second frame, at every line in the first and second frames.

Fourth Embodiment

A fourth embodiment of the present invention has the same circuit configuration as that of the third embodiment, but reading of pixel data by the switch 14 in fourth embodiment is different from that in the third embodiment. Therefore, the fourth embodiment has substantially the same configuration as the second embodiment. In the fourth embodiment, the switch 14 of FIG. 14 reads odd-numbered lines in both of the frames f0 and f1 to output pixel data f10.

According to the fourth embodiment, at a timing when the pixel data is written in the areas A and B, the pixel data fA and fB are output after being delayed for one line period, and the pixel data fA' and fB' are output without delay. At a timing when the pixel data of the frame f0 is not written in the areas A and B, the pixel data fA and fB are output without delay and the pixel data fA' and fB' are output after being delayed for one line period. The controlling of outputting the pixel data fA, fB, fA', and fB' can be easily performed by using an address control with respect to the frame memory 12, or by using a line memory and a selector.

Figure 18:
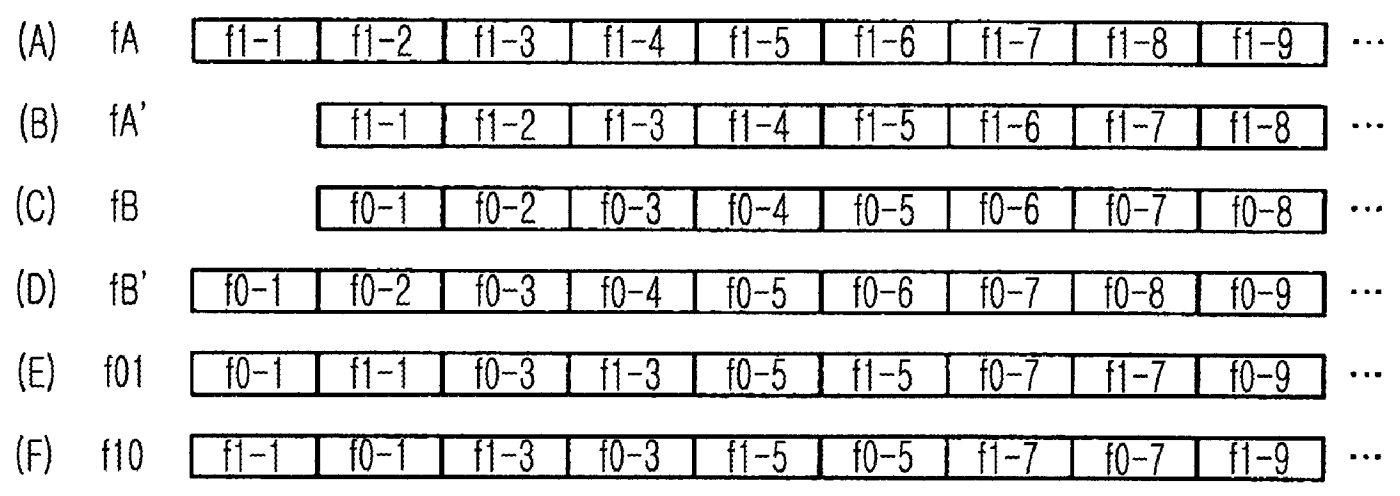

FIG. 18 shows states of the pixel data fA, fA', fB, fB', f01, and f10 when the frame f0 is 2, 4, 6, . . . . When the frame f0 is 2, 4, 6, . . . , the pixel data of the frame f0 is not written in the area A and is written in the area B as shown in FIG. 15. Therefore, as shown in FIGS. 18(A) and 18(B), the pixel data fA' is delayed from the pixel data fA for one line period, and as shown in FIGS. 18(C) and 18(D), the pixel data fB is delayed from the pixel data fB' for one line period.

Since the switch 13 alternately selects the terminals g and h at every line and accordingly the switch 14 alternately selects the terminals j and i, the pixel data f01 output from the switch 13 is as shown in FIG. 18(E) and the pixel data f10 output from the switch 14 is as shown in FIG. 18(F).

Figure 19:
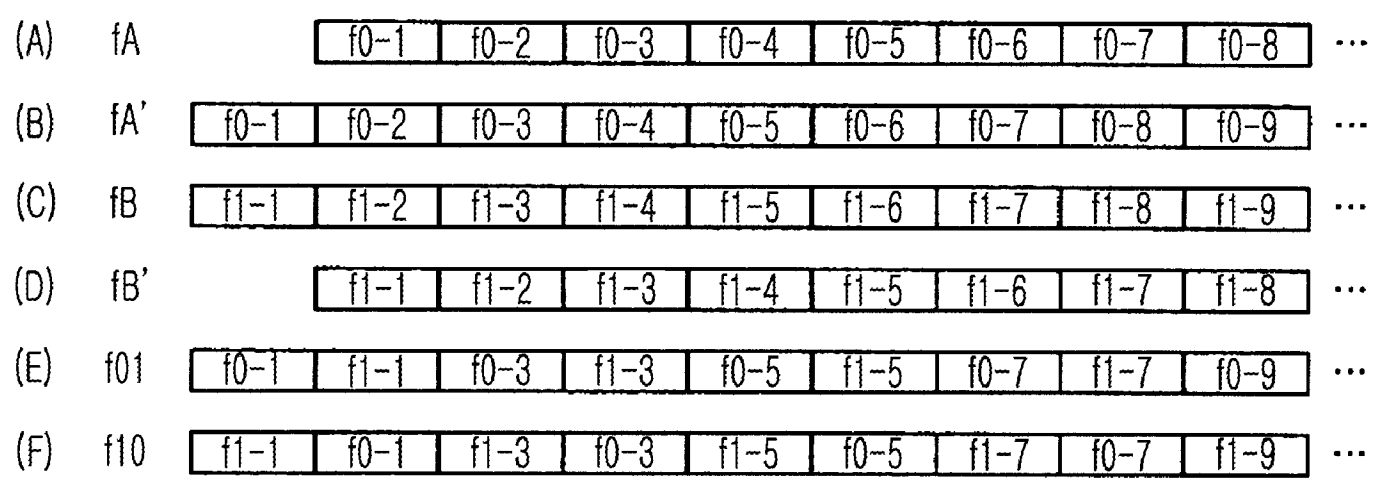

FIG. 19 shows states of the pixel data fA, fA', fB, fB', f01, and f10 when the frame f0 is 3, 5, 7, . . . . When the frame f0 is 3, 5, 7, . . . , the pixel data of the frame f0 is written in the area A and is not written in the area B as shown in FIG. 15. Therefore, as shown in FIGS. 19(A) and 19(B), the pixel data fA is delayed from the pixel data fA' for one line period, and as shown in FIGS. 19(C) and 19(D), the pixel data fB' is delayed from the pixel data fB for one line period.

Since the switch 13 alternately selects the terminals g and h at every line and accordingly the switch 14 alternately selects the terminals j and i, the pixel data f01 output from the switch 13 is as shown in FIG. 19(E) and the pixel data f10 output from the switch 14 is as shown in FIG. 19(F).

As described above, according to the fourth embodiment, the pixel data f01 output from the switch 13 is the pixel data row including the pixel data of the odd-numbered lines of the frame f0 and the pixel data of the odd-numbered lines of the frame f1, which are alternately selected, and the pixel data f10 output from the switch 14 is the pixel data row including the pixel data of the odd-numbered lines of the frame f0 and the pixel data of the odd-numbered lines of the frame f1, which are alternately selected.

In the fourth embodiment, the pixel data f01 may be the pixel data row including the pixel data of the even-numbered lines of the frame f0 and the pixel data of the even-numbered lines of the frame f1, which are alternately selected, and the pixel data f10 may be the pixel data row including the pixel data of the even-numbered lines of the frame f0 and the pixel data of the even-numbered lines of the frame f1, which are alternately selected.

According to the fourth embodiment, the pixel data corresponding to the starting pixel data fctr output from the starting pixel generation unit 5 of FIG. 1 can be directly read from the frame memory 12, and thus, the starting pixel generation unit 5 may be omitted. Operations of the search range pixel generation unit 6, the motion vector candidate selection unit 7, the correlation comparing unit 8, the interpolation pixel generation unit 9, and the frame frequency conversion unit 10 are the same as those of FIG. 10, and thus, descriptions thereof are not provided here. The motion vector detecting apparatus according to the fourth embodiment has the same effects as those of the second embodiment.

In the fourth embodiment, operations that are substantially the same as those of the starting pixel generation unit 5 are performed through controlling of a reading operation from the frame memory 12 by using the frame memory 12 shown in FIG. 14. Therefore, the frame memory 12 functions as a starting pixel generation unit that generates the starting pixel data fctr when detecting the motion vector MV, based on the pixels in a first frame (frame f0) or a second frame (frame f1) that is front or rear frame in a timing order.

The switch 14 functions as a second switching unit for switching alternately and repeatedly between a state where the search range pixel data fmvs is generated based on the pixel data of the selected line in the first frame and a state where the search range pixel data fmvs is generated based on the selected line in the second frame.

Figure 20:
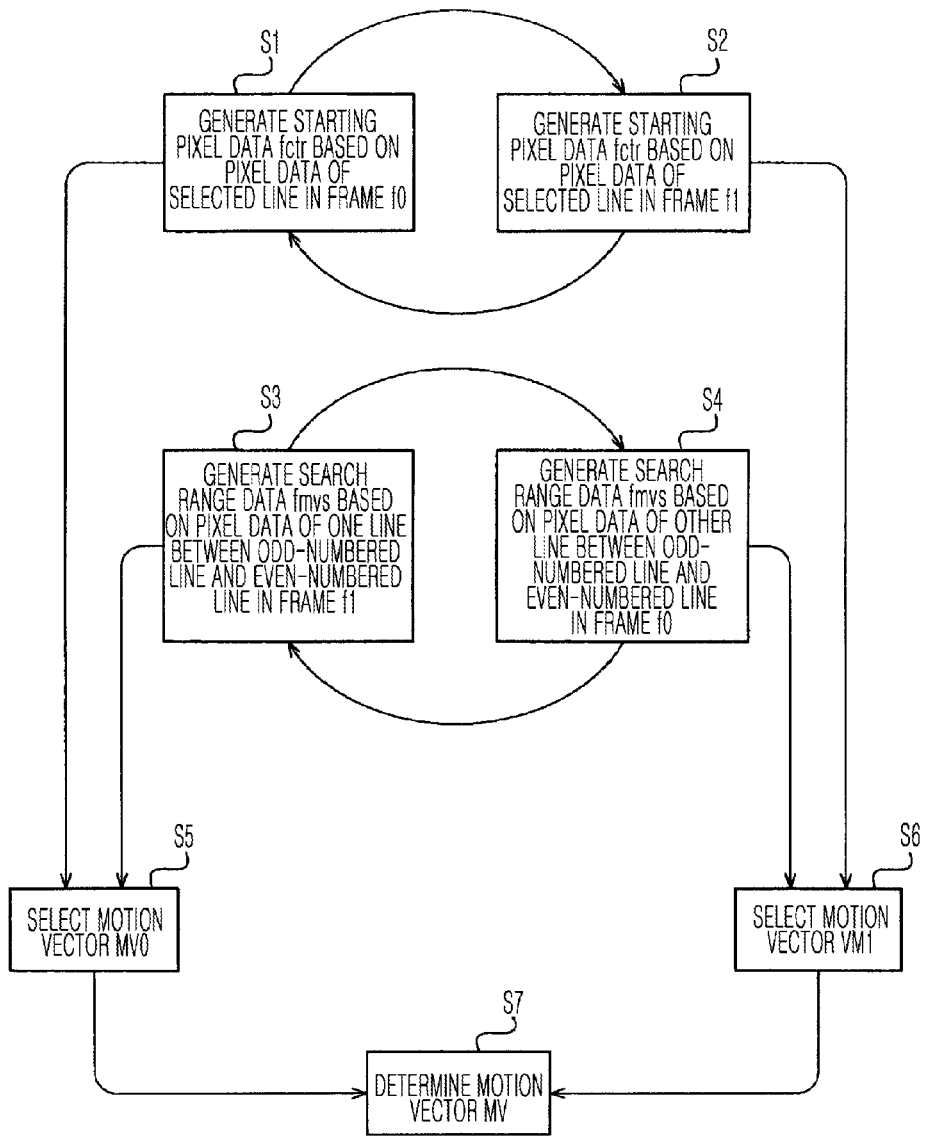
FIG. 20 is a conceptual view for describing a method of detecting a motion vector, according to a first embodiment and a third embodiment of the present invention.

Next, a motion vector detecting method according to a first embodiment and a third embodiment performed by the motion vector detecting apparatus according to the first and third embodiments will be described briefly with reference to FIG. 20. Referring to FIG. 20, the starting pixel generation unit 5 or the frame memory 12 generates the starting pixel data fctr for detecting the motion vector MV based on the pixel data of one line selected between the odd-numbered line and the even-numbered line in the first frame, in operation S1. The starting pixel generation unit 5 or the frame memory 12 generates the starting pixel data fctr based on the pixel data of the selected line in the second frame in operation S2.

The operations S1 and S2 are alternately and repeatedly performed by the switches 3 and 4 or the switches 13 and 14 at every line.

The search range pixel generation unit 6 generates the plurality of search range pixel data fmvs included in predetermined search ranges in the horizontal and vertical directions for detecting the motion vector MV based on the pixel data of one line of the odd-numbered and the even-numbered lines in the second frame, in operation S3. The search range pixel generation unit 6 generates the search range pixel data fmvs based on the pixel data of the other line between the odd-numbered and the even-numbered lines in the first frame, in operation S4.

The operations S3 and S4 are alternately and repeatedly performed by the switches 3 and 4 or the switches 13 and 14 at every line, wherein the operation S3 is performed when the operation S1 is performed and the operation S4 is performed when the operation S2 is performed.

The motion vector candidate selection unit 7 selects the motion vector candidate having the highest correlation among the plurality of motion vector candidates MVc0 connecting pixel of the starting pixel data fctr and each of pixels of the search range pixel data fmvs to each other as a motion vector MV0 (first motion vector) in operation S5, by using the starting pixel data fctr based on the pixel data in the first frame generated in the operation S1 and the search range pixel data fmvs based on the pixel data in the second frame generated in the operation S3.

The motion vector candidate selection unit 7 selects the motion vector candidate having the highest correlation among the plurality of motion vector candidates MVc1 connecting pixels of the starting pixel data fctr and each of pixels of the search range pixel data fmvs to each other as a motion vector MV1 (second motion vector) in operation S6, by using the starting pixel data fctr based on the pixel data in the second frame generated in the operation S2 and the search range pixel data fmvs based on the pixel data in the first frame generated in the operation S4.

The correlation comparing unit 8 compares the motion vector MV0 and the motion vector MV1 with each other in operation S7, and selects the motion vector having higher correlation between the two motion vectors and determines the selected motion vector as a final motion vector MV.

In addition, a motion vector detecting method according to a second embodiment and a fourth embodiment performed by the motion vector detecting apparatus according to the second and fourth embodiments will be described briefly with reference to FIG. 21. In FIG. 21, operations S11 and S12 are the same as the operations S1 and S2 of FIG. 20.

The search range pixel generation unit 6 generates the search range pixel data fmvs based on pixel data of the selected line in the second frame, which is the same as the line selected in the operation S11, in operation S13. The search range pixel generation unit 6 generates the search range pixel data fmvs based on the pixel data of the selected line in the first frame, which is the same as the line selected in the operation S12, in operation S14. The operations S13 and S14 are alternately and repeatedly performed by the switches 3 and 4 or the switches 13 and 14 at every line, so that the operation S13 is performed when the operation S11 is performed and the operation S14 is performed when the operation S12 is performed.

Operations S15 through S17 are the same as the operations S5 through S7 of FIG. 20.

The present invention is not limited to the above described embodiments, that is, may be modified without escaping from the gist of the invention. In FIGS. 1 and 10, the frame rate conversion apparatus that converts the frame rate to twice is described as an example of an apparatus including the motion vector detecting apparatus; however, a frame rate conversion apparatus that converts the frame rate to three times or greater may be used. The apparatus including the motion vector detecting apparatus is not limited to the frame rate conversion apparatus, and may be a film judder removal apparatus. An arbitrary apparatus may include the motion vector detecting apparatus.

According to the motion vector detecting apparatus and method of the present invention, the motion vector may be detected based on each of front and rear frames as a starting point while restraining an increase of a circuit scale.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A motion vector detecting apparatus comprising:
    a starting pixel generation unit which generates a starting pixel data when detecting a motion vector based on pixel data in a first frame or a second frame that is front or rear frame in timing order;
    a search range pixel generation unit which generates a plurality of pieces of search range pixel data included in predetermined search ranges in a horizontal direction and a vertical direction for detecting the motion vector based on the pixel data in the second frame when the starting pixel generation unit generates the starting pixel data based on the pixel data in the first frame, and generates the search range pixel data based on the pixel data in the first frame when the starting pixel generation unit generates the starting pixel data based on the pixel data in the second frame;
    a first switching unit which switches alternately and repeatedly between a state where the starting pixel generation unit generates the pixel data of one line selected from an odd-numbered line and an even-numbered line in the first frame as the starting pixel data and a state where the starting pixel generation unit generates the pixel data of the selected line in the second frame as the starting pixel data, at every line in the first and second frames;
    a second switching unit which switches alternately and repeatedly between a state where the search range pixel generation unit generates the search range pixel data based on the pixel data of one line of the odd-numbered line and the even-numbered line in the first frame, and a state where the search range pixel generation unit generates the search range pixel data based on the pixel data of the other line between the odd-numbered line and the even-numbered line in the second frame, at every line in the first and second frames;

a motion vector candidate selection unit which selects a motion vector candidate having highest correlation among a plurality of motion vector candidates connecting a pixel of the starting pixel data and each of pixels of the search range pixel data to each other as a first motion vector when the starting pixel generation unit generates the starting pixel data based on the pixel data in the first frame by the switching of the first switching unit and the search range pixel generation unit generates the search range pixel data based on the pixel data in the second frame by the switching of the second switching unit, and selects a motion vector candidate having highest correlation among a plurality of motion vector candidates connecting a pixel of the starting pixel data and each of pixels of the search range pixel data to each other as a second motion vector when the starting pixel generation unit generates the starting pixel data based on the pixel data in the second frame by the switching of the first switching unit and when the search range pixel generation unit generates the search range pixel data based on the pixel data in the first frame by the switching of the second switching unit; and a correlation comparing unit which compares the first and second motion vectors with each other, and selects and outputs the motion vector having higher correlation.

2. The motion vector detecting apparatus of claim 1, wherein the correlation comparing unit compares the first and second motion vectors with each other once in a two-line period in the first and second frames, and outputs the selected motion vector continuously for the two-line period.

3. A motion vector detecting apparatus comprising:

a starting pixel generation unit which generates a starting pixel data when detecting a motion vector, based on pixel data in a first frame or a second frame that is front or rear frame in timing order;

a search range pixel generation unit which generates a plurality of pieces of search range pixel data included in predetermined search ranges in a horizontal direction and a vertical direction for detecting the motion vector based on the pixel data in the second frame when the starting pixel generation unit generates the starting pixel data based on the pixel data in the first frame, and generates the search range pixel data based on the pixel data in the first frame when the starting pixel generation unit generates the starting pixel data based on the pixel data in the second frame;

a first switching unit which switches alternately and repeatedly between a state where the starting pixel generation unit generates the pixel data of one line selected from an odd-numbered line and an even-numbered line in the first frame as the starting pixel data and a state where the starting pixel generation unit generates the pixel data of the selected line in the second frame as the starting pixel data, at every line in the first and second frames;

a second switching unit which switches alternately and repeatedly between a state where the search range pixel generation unit generates the search range pixel data based on the pixel data of the selected line in the first frame, and a state where the search range pixel generation unit generates the search range pixel data based on the pixel data of the selected line in the second frame, at every line in the first and second frames;

a motion vector candidate selection unit which selects a motion vector candidate having highest correlation among a plurality of motion vector candidates connecting a pixel of the starting pixel data and each of pixels of the search range pixel data to each other as a first motion vector when the starting pixel generation unit generates the starting pixel data based on the pixel data in the first frame by the switching of the first switching unit and the search range pixel generation unit generates the search range pixel data based on the pixel data in the second frame by the switching of the second switching unit, and selects a motion vector candidate having highest correlation among a plurality of motion vector candidates connecting a pixel of the starting pixel data and each of pixels of the search range pixel data to each other as a second motion vector when the starting pixel generation unit generates the starting pixel data based on the pixel data in the second frame by the switching of the first switching unit and when the search range pixel generation unit generates the search range pixel data based on the pixel data in the first frame by the switching of the second switching unit; and a correlation comparing unit which compares the first and second motion vectors with each other, and selects and outputs the motion vector having higher correlation.

4. A motion vector detecting method comprising:

repeating alternately a state where pixel data of one line selected between an odd-numbered line and an even-numbered line in a first frame is generated as starting pixel data when detecting a motion vector, and a state where pixel data of the selected line in a second frame is generated as starting pixel data, at every line in the first and second frames, wherein the first and second frames are front and rear frames in timing order;

repeating alternately a state where a plurality of pieces of search range pixel data included in predetermined search ranges in a horizontal direction and a vertical direction for detecting the motion vector is generated based on the pixel data of one line of the odd-numbered line and the even-numbered line in the first frame and a state where the search range pixel data is generated based on the pixel data of the other line of the odd-numbered line and the even-numbered line in the second frame, at every line in the first and second frames, wherein the search range pixel data is generated based on the pixel data of the second frame when the starting pixel data is generated based on the pixel data of the first frame and the search range pixel data is generated based on the pixel data of the first frame when the starting pixel data is generated based on the pixel data in the second frame;

selecting a motion vector candidate having highest correlation among a plurality of motion vector candidates connecting a pixel of the starting pixel data and each of and pixels of the search range pixel data to each other as a first motion vector, when the starting pixel data is generated based on the pixel data of the first frame and when the search range pixel data is generated based on the pixel data in the second frame;

selecting a motion vector candidate having highest correlation among a plurality of motion vector candidates connecting a pixel of the starting pixel data and each of pixels of the search range pixel data to each other as a second motion vector, when the starting pixel data is generated based on the pixel data of the second frame and when the search range pixel data is generated based on the pixel data in the first frame; and selecting and outputting one of the first and second motion vectors having higher correlation by comparing the first and second motion vectors with each other.

5. The motion vector detecting method of claim 4, wherein the first and second motion vectors are compared with each other once in a two-line period in the first and second frames, and the selected motion vector is output continuously for the two-line period.

6. A motion vector detecting method comprising:

repeating alternately a state where pixel data of one selected between an odd-numbered line and an even-numbered line in a first frame is generated as starting pixel data when detecting a motion vector, and a state where pixel data of the selected line in a second frame as starting pixel data at every line in the first and second frames, wherein the first and second frames are front and rear frames in timing order;

repeating alternately a state where a plurality of pieces of search range pixel data is generated based on the pixel data of the selected line in the first frame and a state where the search range pixel data is generated based on the pixel data of the selected line in the second frame, wherein the search range pixel data is generated based on the pixel data of the second frame when the starting pixel data is generated based on the pixel data of the first frame and the search range pixel data is generated based on the pixel data of the first frame when the starting pixel data is generated based on the pixel data in the second frame;

selecting a motion vector candidate having highest correlation among a plurality of motion vector candidates connecting a pixel of the starting pixel data and each of pixels of the search range pixel data to each other as a first motion vector, when the starting pixel data is generated based on the pixel data of the first frame and when the search range pixel data is generated based on the pixel data in the second frame;

selecting a motion vector candidate having highest correlation among a plurality of motion vector candidates connecting a pixel of the starting pixel data and each of pixels of the search range pixel data to each other as a second motion vector, when the starting pixel data is generated based on the pixel data of the second frame and when the search range pixel data is generated based on the pixel data in the first frame; and selecting and outputting one of the first and second motion vectors having higher correlation by comparing the first and second motion vectors with each other.

* * * * *